(12) United States Patent
Dellantoni et al.

(10) Patent No.: US 10,091,465 B2
(45) Date of Patent: Oct. 2, 2018

(54) SCALABLE INTEGRATED ELECTRONIC CONTROL UNIT FOR VEHICLE

(71) Applicant: MAGNA ELECTRONICS INC., Auburn Hills, MI (US)

(72) Inventors: Nikolaus Dellantoni, Sooss (AT); Bernhard Schinkowitsch, Vienna (AT); André Schoenekaes, Moembris (DE); Axel Nix, Birmingham, MI (US); Niall R. Lynam, Holland, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 318 days.

(21) Appl. No.: 14/714,761

(22) Filed: May 18, 2015

(65) Prior Publication Data

US 2015/0264321 A1    Sep. 17, 2015

Related U.S. Application Data

(63) Continuation of application No. 13/377,673, filed as application No. PCT/US2010/038477 on Jun. 14, 2010, now Pat. No. 9,036,026.
(Continued)

(51) Int. Cl.
*H04N 7/18* (2006.01)
*G01C 21/36* (2006.01)
*B60R 1/00* (2006.01)

(52) U.S. Cl.
CPC .............. *H04N 7/181* (2013.01); *B60R 1/00* (2013.01); *G01C 21/3602* (2013.01);
(Continued)

(58) Field of Classification Search
None
See application file for complete search history.

(56) References Cited

U.S. PATENT DOCUMENTS

| | | | |
|---|---|---|---|
| 4,862,594 A | 9/1989 | Schierbeek et al. | |
| 4,937,945 A | 7/1990 | Schofield et al. | |
| (Continued) | | | |

FOREIGN PATENT DOCUMENTS

| | | |
|---|---|---|
| JP | 2006270586 | 10/2006 |
| WO | WO2002/095581 | 11/2002 |

OTHER PUBLICATIONS

International Search Report and Written Opinion dated Sep. 2, 2010 for corresponding PCT Application No. PCT/US2010/038477.

*Primary Examiner* — Janese Duley
(74) *Attorney, Agent, or Firm* — Honigman Miller Schwartz and Cohn, LLP

(57) ABSTRACT

A vehicular scalable integrated control system includes a plurality of cameras having respective fields of view exterior of the vehicle. Image data captured by the cameras is processed by an image processor of a vehicular scalable integrated control unit. A display screen for displaying video images derived, at least in part, from captured image data. The system is operable to fuse captured image data with data captured by a radar device, an ultrasonic sensor and/or an infrared sensor. The system is part of an overall active safety sensing system, which includes fusion of outputs from a plurality of sensing devices to achieve environmental awareness at and surrounding the vehicle. The overall active safety sensing system is operable to at least one of (i) at least partially control the vehicle as the vehicle is driven along a road and (ii) provide alert warnings to a driver of the vehicle.

20 Claims, 23 Drawing Sheets

Multi-view Camera System Block Diagram

Related U.S. Application Data

(60) Provisional application No. 61/186,573, filed on Jun. 12, 2009.

(52) U.S. Cl.
CPC .... *G01C 21/3679* (2013.01); *B60R 2300/105* (2013.01); *B60R 2300/20* (2013.01)

(56) References Cited

U.S. PATENT DOCUMENTS

| | | | |
|---|---|---|---|
| 5,131,154 A | 7/1992 | Schierbeek et al. |
| 5,255,442 A | 10/1993 | Schierbeek et al. |
| 5,550,677 A | 8/1996 | Schofield et al. |
| 5,632,092 A | 5/1997 | Blank et al. |
| 5,670,935 A | 9/1997 | Schofield et al. |
| 5,752,065 A | 5/1998 | Stagier et al. |
| 5,796,094 A | 8/1998 | Schofield et al. |
| 5,877,897 A | 3/1999 | Schofield et al. |
| 5,924,212 A | 7/1999 | Domanski |
| 6,292,718 B2 | 9/2001 | Staiger |
| 6,313,454 B1 | 11/2001 | Bos et al. |
| 6,320,176 B1 | 11/2001 | Schofield et al. |
| 6,353,392 B1 | 3/2002 | Schofield et al. |
| 6,396,397 B1 | 5/2002 | Bos et al. |
| 6,477,464 B2 | 11/2002 | McCarthy et al. |
| 6,498,620 B2 | 12/2002 | Schofield et al. |
| 6,571,136 B1 | 5/2003 | Staiger |
| 6,628,441 B1 | 9/2003 | Staiger |
| 6,629,033 B2 | 9/2003 | Preston et al. |
| 6,654,910 B1 | 11/2003 | Eibach et al. |
| 6,678,614 B2 | 1/2004 | McCarthy et al. |
| 6,690,268 B2 | 2/2004 | Schofield et al. |
| 6,778,073 B2 | 8/2004 | Lutter et al. |
| 6,806,452 B2 | 10/2004 | Bos et al. |
| 6,824,281 B2 | 11/2004 | Schofield et al. |
| 6,946,978 B2 | 9/2005 | Schofield |
| 6,950,312 B2 | 9/2005 | Staiger |
| 6,952,782 B2 | 10/2005 | Staiger |
| 7,004,593 B2 | 2/2006 | Weller et al. |
| 7,004,606 B2 | 2/2006 | Schofield |
| 7,005,974 B2 | 2/2006 | McMahon et al. |
| 7,038,577 B2 | 5/2006 | Pawlicki et al. |
| 7,123,168 B2 | 10/2006 | Schofield |
| 7,140,026 B2 | 11/2006 | Staiger |
| 7,146,260 B2 | 12/2006 | Preston et al. |
| 7,167,796 B2 | 1/2007 | Taylor et al. |
| 7,178,049 B2 | 2/2007 | Lutter |
| 7,205,904 B2 | 4/2007 | Schofield |
| 7,349,844 B2 | 3/2008 | Staiger |
| 7,355,524 B2 | 4/2008 | Schofield |
| 7,412,328 B2 | 8/2008 | Uhlmann et al. |
| 7,474,963 B2 | 1/2009 | Taylor et al. |
| 7,697,027 B2 | 4/2010 | McMahon et al. |
| 7,777,611 B2 | 8/2010 | Desai |
| 8,086,771 B2 | 12/2011 | Staiger et al. |
| 8,625,778 B2 | 1/2014 | Jung et al. |
| 9,036,026 B2 | 5/2015 | Dellantoni et al. |
| 2005/0154475 A1 | 7/2005 | Forchert et al. |
| 2007/0118280 A1 | 5/2007 | Uhlmann et al. |
| 2008/0007618 A1 | 1/2008 | Yuasa |
| 2008/0046150 A1* | 2/2008 | Breed ............... B60R 21/0134 701/45 |
| 2008/0106389 A1 | 5/2008 | Desai |
| 2008/0174453 A1 | 7/2008 | Schofield |
| 2008/0192984 A1 | 8/2008 | Higuchi et al. |
| 2012/0062743 A1* | 3/2012 | Lynam ............... B60Q 9/005 348/148 |

* cited by examiner

ECU Electrical Concept Block Diagram

ECU with Multi-View Camera System Block Diagram

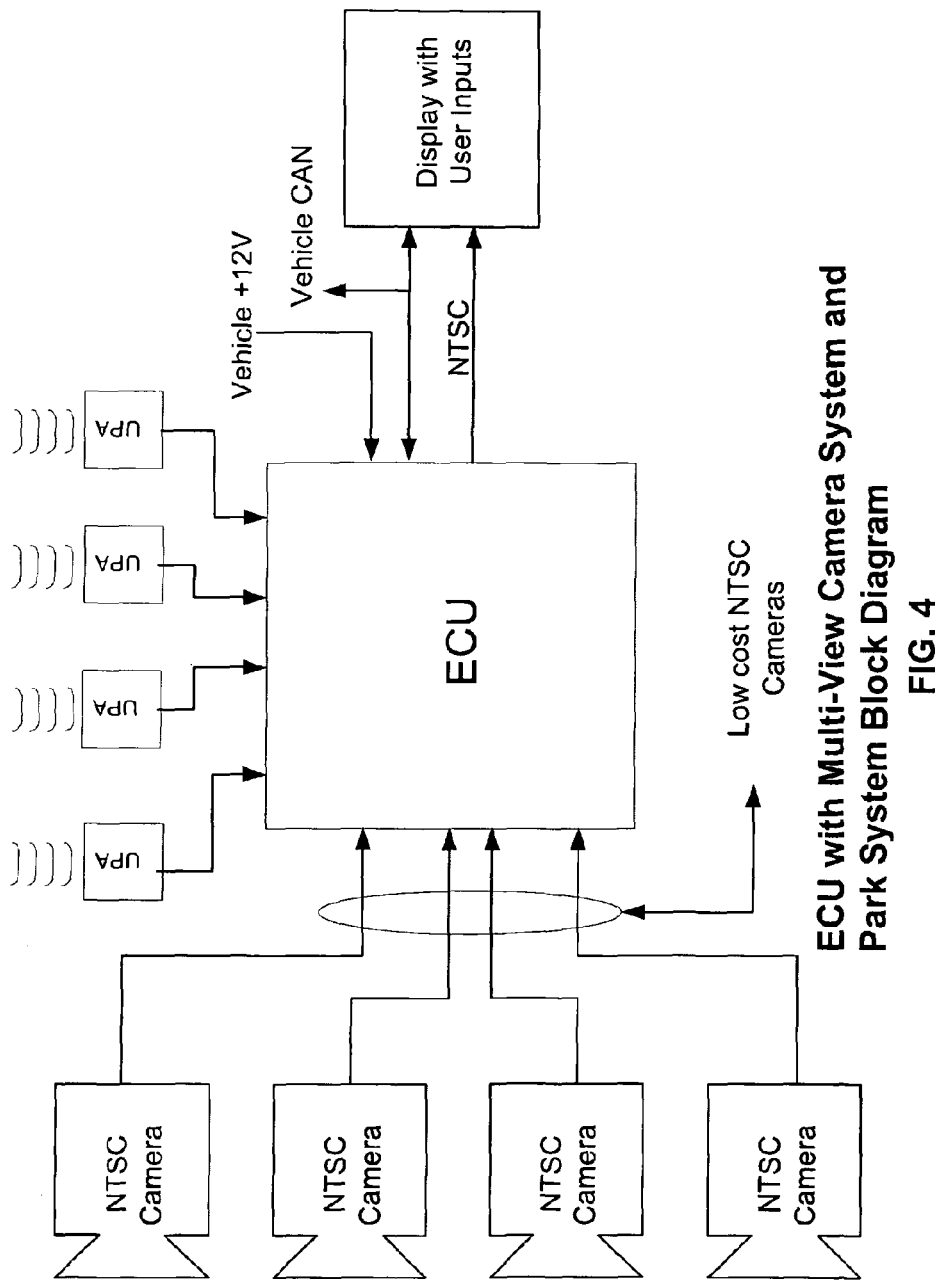

The present invention provides a scaleable vehicle control module that has the ability to host multiple core functions cost-effectively and has the ability to fuse these functions together to offer unique features that are not easily created with independent control modules.

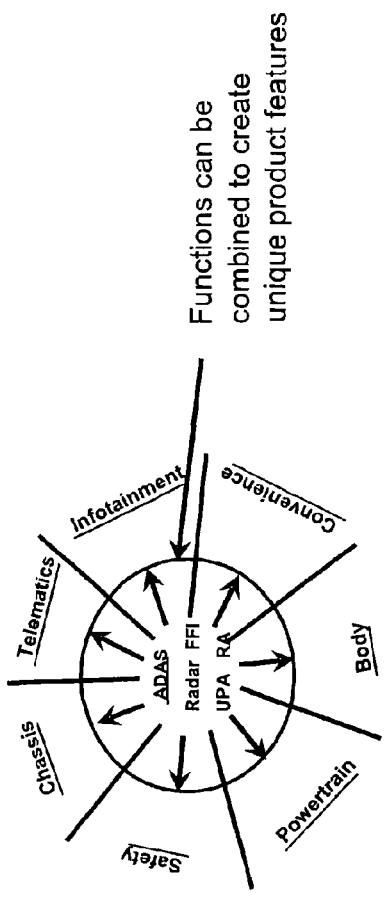

FIG. 5

— The Control Module is scaleable
  - A common hardware architecture can be used to control multiple complex or simple functions.
  - Customization will be required for incorporation of functions from each system, but the common architecture will apply to each product in the control module family.

— The Control Module is flexible
  - Functions from various vehicle subsystems can be hosted by the control module.
  - The architecture supports any OEM and vehicle model — The Control Module is stable
  - Capable of running safety-critical functions.
  - Parallel processing enables redundancy for critical functions.

— The Control Module is low-cost
  - The vehicle system-level cost will be lower than or equal to a vehicle equipped with equivalent independent ECUs Tetrahedragonal System Architecture The System Manager or
TCET System Architecture
allows a maximum of
system scalability and
variability to allow for
component minimization

FIG. 10 VEHICLE CONTROL UNIT PRODUCT FAMILY

SCALABLE INTEGRATED ELECTRONIC CONTROL UNIT FOR VEHICLE

CROSS REFERENCE TO RELATED APPLICATIONS

The present application is a continuation of U.S. patent application Ser. No. 13/377,673, filed Dec. 12, 2011, now U.S. Pat. No. 9,036,026, which is a 371 national phase application of PCT Application No. PCT/US2010/038477, filed Jun. 14, 2010, which claims the benefit of U.S. provisional application Ser. No. 61/186,573, filed Jun. 12, 2009, which is hereby incorporated herein by reference in its entirety.

FIELD OF THE INVENTION

The present invention relates to processing systems for vehicles and, more particularly, to processing systems that process inputs from various sensors and control various vehicular systems and accessories in response to such inputs.

BACKGROUND TO THE INVENTION

It is known to provide a data/computing processor (such as an electronic control unit or ECU) that receives multiple inputs from and/or provides multiple outputs to multiple sensors, controls and/or accessories in an automotive vehicle. Examples of such processing systems are described in U.S. Pat. Nos. 6,629,033; 6,778,073; 7,146,260; and 7,178,049, which are hereby incorporated herein by reference in their entireties. It is also known to provide a vehicle system that receives multiple inputs and may provide or generate different outputs in response to processing of the inputs, such as the systems described in U.S. Pat. Nos. 7,697,027; 7,355,524 and 7,205,904, which are hereby incorporated herein by reference in their entireties.

SUMMARY OF THE INVENTION

The present invention provides a vehicular scalable integrated electronic control unit or module or system that is responsive to multiple inputs from and/or is capable to provide multiple outputs to multiple sensors or accessories or sub-systems, such as receiving and processing video data from multiple vehicular video cameras and/or such as receiving and processing data from various vehicular sensors and transducers such as exterior-mounted/sensing sensors and/or interior-mounted/sensing sensors. The vehicular scalable integrated electronic control unit or module or system can receive input from and/or provide output to a variety of vehicular systems/sensor, such as vehicle status sensors or indicators, radar sensors or systems, chassis sensors or systems, speed/propulsion sensors or systems, wireless-receiving sensors or systems such as antennae and transceivers, or the like. The vehicular scalable integrated control unit can control singular or multiple functions or systems of the vehicle, such as chassis control, propulsion control, safety system control, infotainment control, communications control and the like, and does so in a manner that is dynamic, is scalable and is flexible. The vehicular scalable electronic control unit receives multiple inputs and provides an appropriate function or processing responsive to a determined driving condition or situation. The vehicular scalable electronic control unit thus provides a means for enhancing computing and processing inputs from multiple sources to provide multiple functions. The present invention provides a scalable and flexible and reliable control unit or system for a vehicle that also provides reduced costs and reduced packaging concerns over the multiple electronic control units or ECUs in use in vehicles today.

The vehicular scalable integrated control unit or module or system of the present invention preferably incorporates inputs from driver assistance system components (such as cameras, radar sensors, ultrasonic sensors and/or infrared sensors or the like), or systems or subsystems, and does so in a manner that is scalable and flexible in terms of data processing, software compatibility and overall computing economy/efficiency, and in particular the present invention facilitates dynamic situational processing where computing resources adapt to particular driving or vehicle conditions or situations. The architecture and composition of the scalable integrated electronic control unit facilitates and enables dynamic/scalable and flexible integration/combination into a centralized scalable/flexible control/command/communication system or module of algorithmic processing and computing of driver assistance system (DAS) functions and applications with the likes of navigational functions or systems or subsystems and with infotainment functions or systems or subsystems (such as, for example, radio/entertainment functions and accessories, including satellite radio, MP3 players, PDAs, telematics systems (such as including Car2Car, Car2X, ONSTAR® and/or SYNC™), and/or wireless connectivity and the like. The architecture and composition of the scalable integrated electronic control unit facilitates and enables integration of and combination of features and functions currently associated with a Head Unit (as such are commonly known in the automotive art) with DAS functions such as surround vision or reverse camera vision in isolation of or in combination with machine vision of road signs, lane markings, objects, pedestrians, headlights/taillights and/or the like. The architecture and composition of the scalable integrated electronic control unit facilitates and enables providing or including centralized video image processing and/or image processing of the video outputs of multiple video cameras of the vehicle, and may include combination/integration/co-processing of such data with the likes of map/navigational data and the likes of radar data for displaying graphic overlay-enhanced video images to the driver of the vehicle and/or provision of machine vision-processed image data to vehicular accessories and controls (such as an ACC control) via image-processed detection of objects or the like in captured image data from various vehicular video cameras, such as rear backup cameras, forward facing imagers and night vision cameras. The architecture of the scalable integrated electronic control unit enables recovery/rerouting/redundancy should a fault or failure develop in software and/or hardware of the scalable integrated electronic control unit or system, and the architecture of the scalable integrated electronic control unit further enables robust, reliable and secure data processing in a central electronic control unit or ECU.

The vehicular scalable integrated control unit may receive and/or process data with a hierarchy of criticality to efficient/safe vehicle operation and function, and the architecture preferably further accommodates and facilitates provision of less critical but consumer attractive and consumer importable features and functions, and provides a robust and reliable firewall assuring that consumer imported or downloaded features do not interfere with or degrade vehicular functions or controls existing in the vehicle and provided thereto by the automaker. The architecture and construction of the vehicular scalable integrated control unit of the present invention accommodates a plurality of software or applications utilizing a plurality of operating systems, and enables an automaker to centralize in a scalable and flexible control unit some, much or all of software and/or hardware currently dispersed in vehicles in a multitude of application-dedicated ECUs and accessories, thereby facilitating use of lower cost/limited functionality and reduced-data processing, lower power, less-intelligent sensors (such as lower cost cameras) and also facilitating provision of software from software specialists that may be distinct and different from the suppliers to the automakers of the ECU or associated computing or data processing hardware that runs the software.

Thus, the architecture/construction/composition of the vehicular scalable integrated control unit allows an automaker to flexibly and economically centralize the computer/algorithmic processing of features and applications that conventionally are processed in isolation via multiple generally non-connected dedicated ECUs, and further allows and enables selection by the automaker of a preferred or specialized or more affordable software supplier that may optionally be independent of either the supplier of the vehicular scalable integrated control unit and/or of the various sensors/controls/subsystems/systems/accessories that provide and/or receive data or I/O control thereto or therefrom. Preferably, the vehicular scalable integrated control unit comprises a scalable Driver Assistance System (DAS) situational analysis vehicle integrated control unit that also provides dynamic and situational-dependent control of and/or I/O control of functions currently associated with a Head Unit, and that has capabilities or domain to accommodate and run consumer-attractive applications. Such applications may be customized for or be appropriate for a particular type or brand or level of vehicle, or a particular type or level of driver and/or profile identity of the driver and/or occupants of the vehicle, or a particular driving situation and/or geographic location and/or traffic condition.

Preferably, the vehicular scalable integrated control unit comprises a scalable DAS situational analysis vehicle integrated control unit system that includes a safety domain controller in the vehicle that, as the vehicle begins to travel or while it is traveling in various traffic conditions and under various environmental conditions or when parking or reversing, calculates the probability of an accident—and uses this information to initiate responses that can prevent or mitigate an accident at least in part and preferably completely. If this is not possible, the system of the present invention tries to minimize the consequences of an accident such as by, for example, pre-filling/pre-conditioning of brakes, tightening of seatbelts, positioning of head rests, closing windows and a sunroof and pre-warning/arming airbags ahead of time so that deployment can be controlled optimally. A threat recognizer/evaluator and a risk assessor is preferably included in the system to enable such decision-making in a scalable and flexible manner, and as the imminence of a potential collision increases, a DAS Situational Analyzer of the vehicular scalable integrated control unit deploys available processing power and memory/I/O resources to collision avoidance/mitigation.

These and other objects, advantages, purposes and features of the present invention will become apparent upon review of the following specification in conjunction with the drawings.

BRIEF DESCRIPTION OF THE DRAWINGS

FIG. 4 is a schematic of a vehicular multi-view camera system and easy park system in accordance with the present invention;

FIGS. 5 and 6 are schematics of a vehicular scalable control system in accordance with the present invention;

DESCRIPTION OF THE PREFERRED EMBODIMENTS

The present invention provides a vehicular scalable integrated control unit or module or system that is responsive to inputs from multiple accessories and/or systems or subsystems and is operable to control or adjust or activate/deactivate various accessories or vehicle controls. The vehicular scalable electronic control unit provides a single or common or central control or processor that may provide various functions depending on detected or determined driving conditions or situations and/or vehicle conditions and/or weather conditions and/or geographical location of the vehicle and/or the like. The vehicular scalable electronic control unit provides dynamic situational processing and provides control functions accordingly, thereby providing appropriate controls for particular situations while limiting or reducing processing of other inputs or parameters that are not as relevant to the detected or determined vehicle/driving situation. The scalable integrated electronic control unit is configurable for different applications and may selectively include different software and/or applications and may be selectively connected to different accessories or inputs, in order to provide the desired or appropriate functions for the vehicle equipped with the system. The scalable integrated electronic control unit or system of the present invention thus provides a flexible (may be configured for various applications and operating systems and the like) and scalable (may have a few functions or lots of functions available and/or running at any time) system that reduces the need for multiple isolated processors and control units of the vehicle and thus provides a lower cost control system with enhanced functional capabilities, as discussed below.

Figure 1:
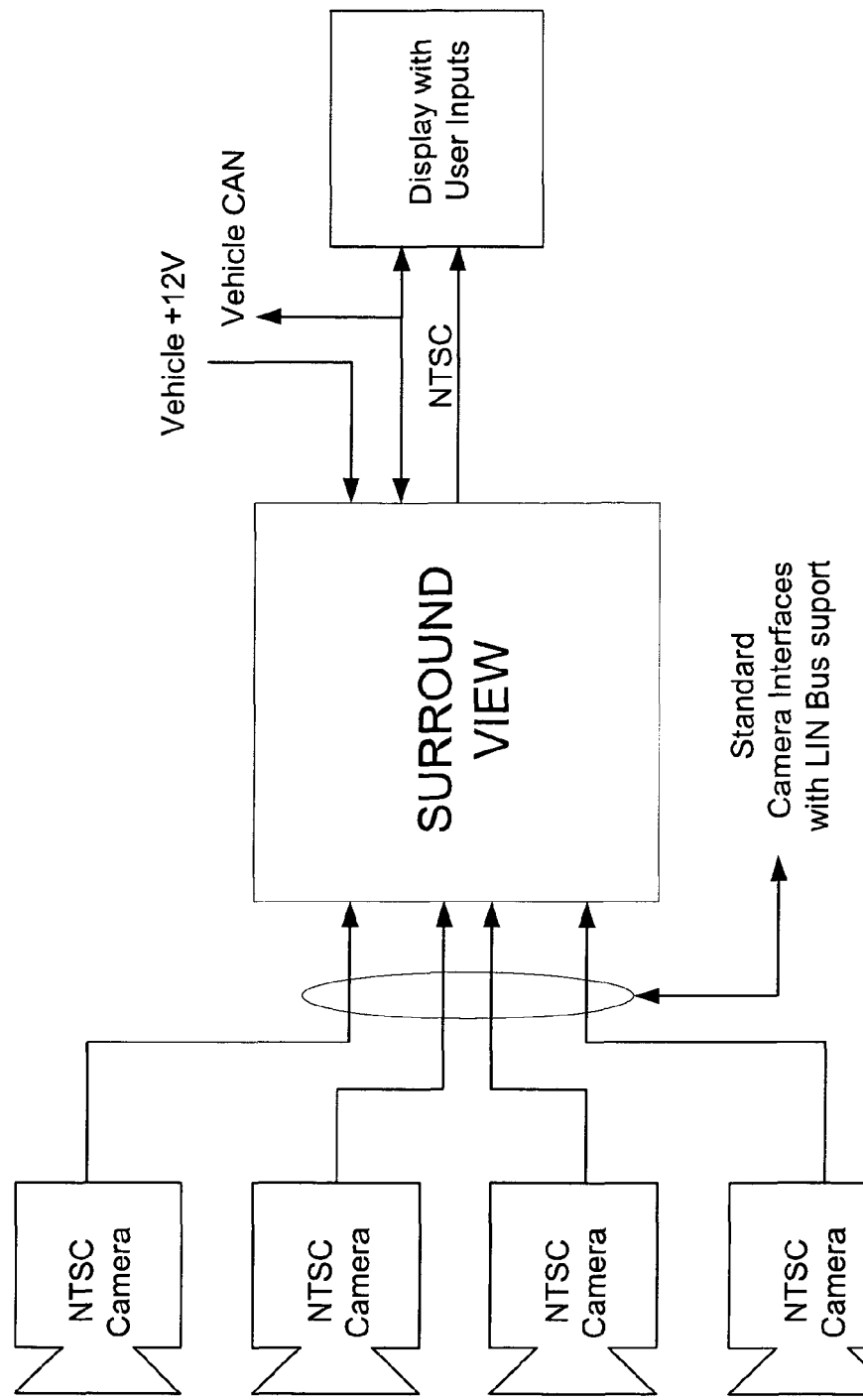
FIG. 1 is a schematic of a vehicular multi-view camera system, having a reverse aid control unit.

Referring now to the drawings and the illustrative embodiments depicted therein, a 360 degree view system on a vehicle may provide the driver with a view encompassing the area around the entire vehicle (FIG. 1). This type of automotive driving aid provides visual information to the driver about the vehicle surroundings and aids in the maneuvering of the vehicle. Such a system may utilize aspects of the alert systems described in PCT Application No. PCT/US2010/025545, filed Feb. 26, 2010; and/or U.S. provisional applications, Ser. No. 61/180,257, filed May 21, 2009; Ser. No. 61/156,184, filed Feb. 27, 2009; and Ser. No. 61/174,596, filed May 1, 2009, which are all hereby incorporated herein by reference in their entireties.

Figure 2:
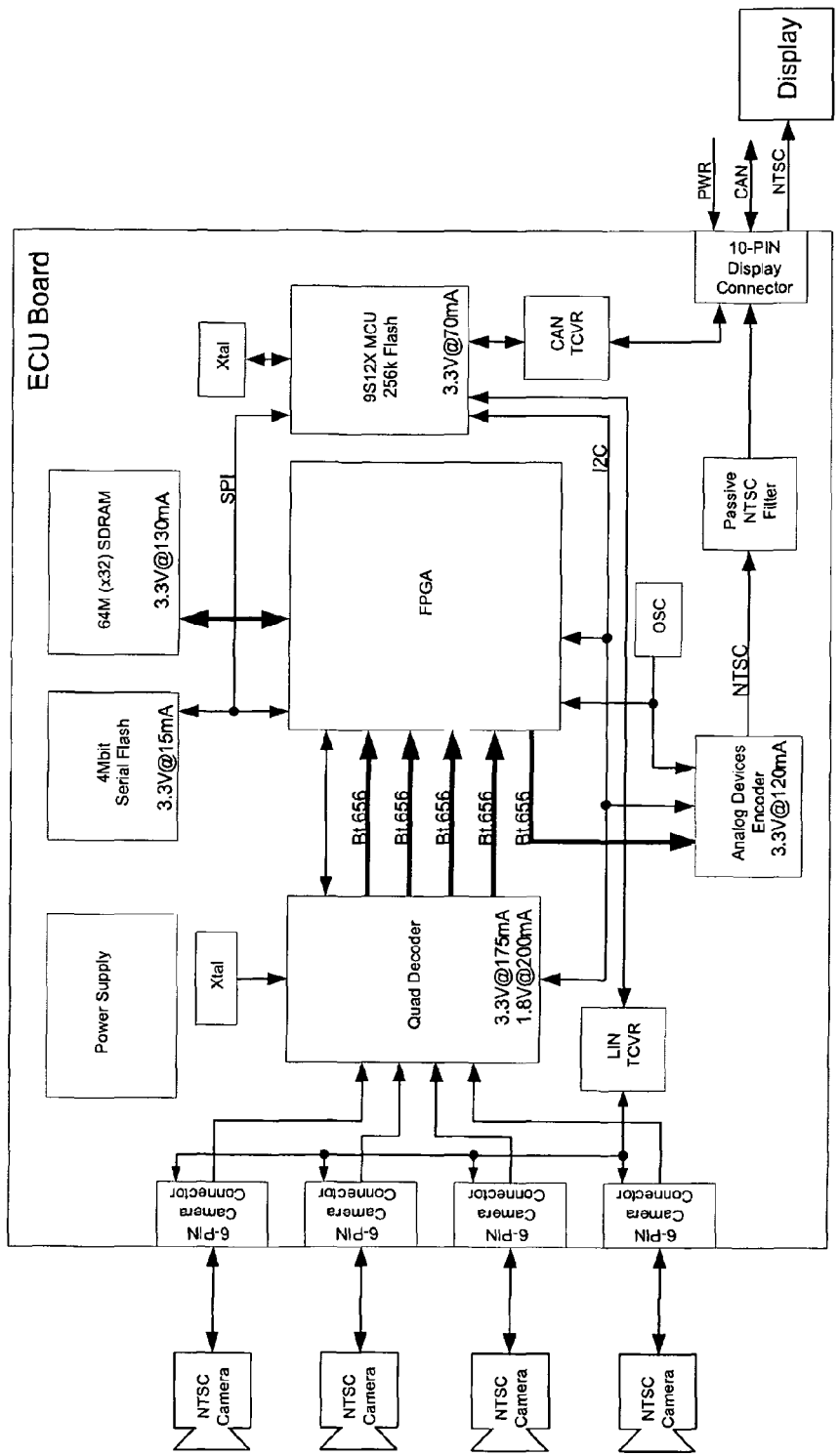
FIG. 2 is a schematic of a vehicular system in accordance with the present invention.

The system level architecture of such systems encompasses an electronic control unit (ECU) to receive live video input from a plurality of vehicular cameras, such as, for example, four separate NTSC CMOS video cameras mounted at the front, sides and rear of the vehicle (and with fields of view external of the vehicle). The vehicular scalable electronic control unit processes the individual received video feeds (or compressed data therefrom) from the individual video sources, and may perform machine vision image processing to determine objects of interest/hazard, may add indicia or icons or visual alerts or graphic overlays, may merge separate captured images into the likes of a surround-view presentation, may combine/co-process the received video images with other received data, such as from the likes of ultrasonic or radar or IR sensors or from other vehicle equipment/accessories/sensors, and may present/feed (such via a vehicular network or via a direct wired connection) that information to a video display viewable by the driver (such as a console-mounted video screen or a video mirror) and/or may generate vehicle equipment control signals/outputs that control the likes of braking or speed or hazard alerts or the like. The presentation of this video information on a video screen viewable by the driver while driving preferably has driver-selectable viewing configurations including: a 360 degree view with a perspective reference above the vehicle (birds-eye view) for the purpose of identifying obstacles about the vehicle, and the system provided selection of any single camera in full screen mode to provide more information about the region of interest, and a rearward looking view of the vehicle to aid in maneuvering the vehicle while moving in reverse. FIG. 2 shows the system level block diagram of the 360 degree view system.

Such a system can have an architecture such as shown in FIG. 2. FIG. 2 illustrates the inclusion of the NTSC Decoder, video processor, and NTSC encoder. In addition, a stand alone microcontroller may support MSCAN communication, power supply management, system state control, system configuration, and act as a co-processor for generating algorithm dependent overlays.

Figure 3:
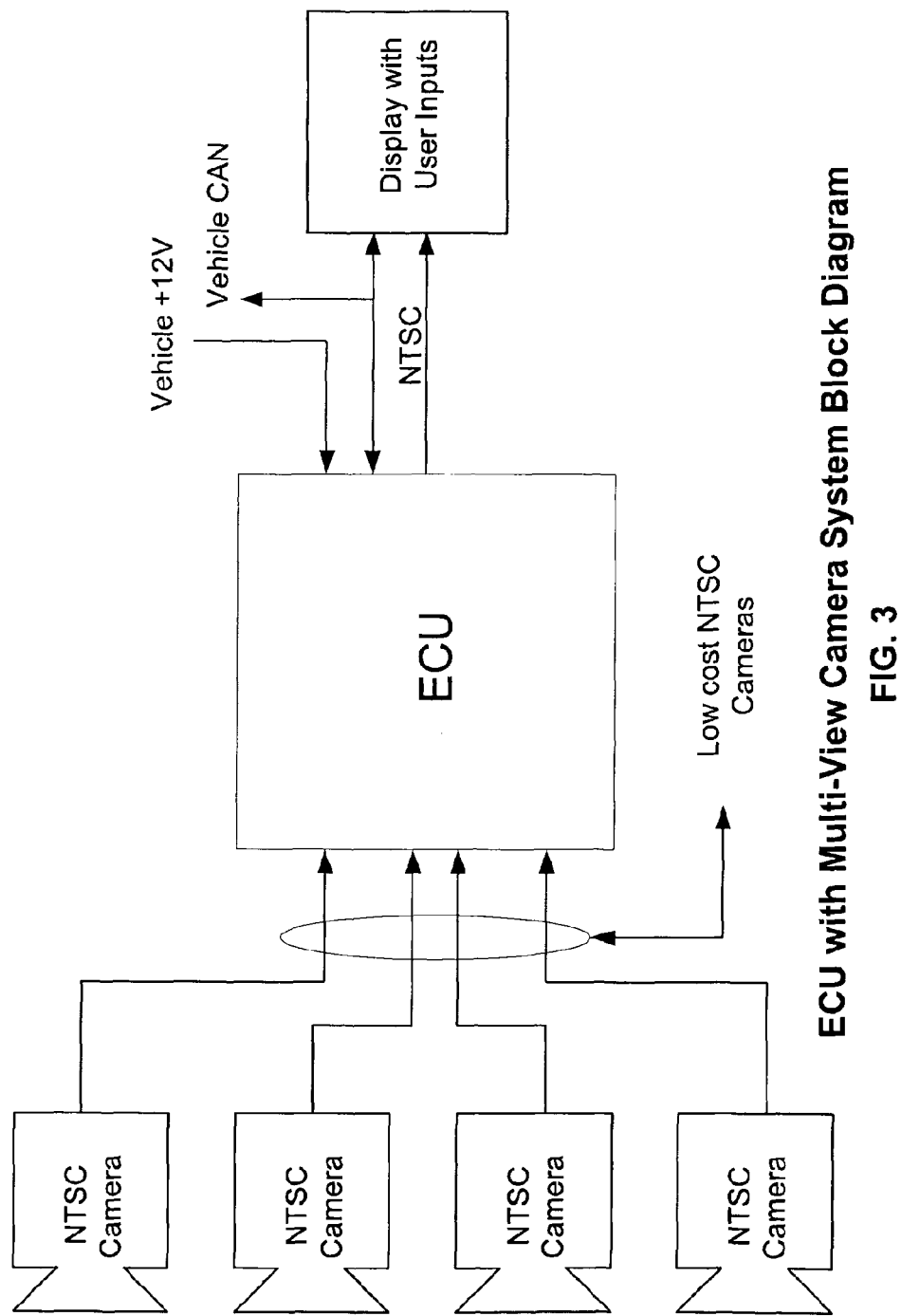
FIG. 3 is a schematic of a vehicular multi-view camera system of the present invention.

FIG. 3 shows a block diagram of a vehicular scalable electronic control unit or module or system in accordance with the present invention. The advantages of the system shown in FIG. 3 include, for example, that the scalable integrated electronic control unit can be used for other functions when the 360 view camera system is not needed/used; the scalable integrated electronic control unit has the capability to run other functions in addition to the 360 view system; and the system has the ability to use cameras for other applications when not used by the 360 view application. The control system of the present invention thus provides a flexible, scalable, adaptable system that can be configured to receive inputs from multiple cameras and/or other sensors (such as ultrasonic or radar sensors such as shown in FIG. 4) and to provide a desirable or appropriate output or display responsive to the cameras and to a detected or selected driving condition or situation, and to provide other control functions for other accessories or systems in response to a detected or selected driving condition or situation, as discussed below.

The present invention provides a vehicle control system or driver assistance system (DAS) that is responsive to inputs from multiple sensors or accessories and operable to control various accessories, such as a video display or information display or other control systems or subsystems of the vehicle. The vehicular scalable electronic control unit or module or system thus may provide a single control unit or module that may provide multiple functions, and may automatically provide appropriate functions or processing responsive to a driving condition of the vehicle. For example, when the system detects that the vehicle is in a reverse gear or making a reversing maneuver, the system may automatically provide a video display of the images captured by a rearward facing camera of the vehicle, and may stop or inhibit or limit processing of images captured by other cameras or sensors, such as forward facing cameras and/or the like of the vehicle. Thus, the control system provides enhanced features and functions and avoids the need for multiple isolated processors since the system manager of the control unit of the present invention dynamically, and in accordance with a particular driving, vehicle, driver, geographic, weather, traffic, and/or road condition, selectively provides a desired or appropriate degree of processing for the appropriate inputs depending on the particular driving condition or situation of the vehicle. The sensors need not include their own processors and the like, and may be readily linked to or "plugged into" the control unit or system, whereby the control unit may receive and process signals from the sensors accordingly, and depending on the particular driving condition or situation of the vehicle.

Figure 6:
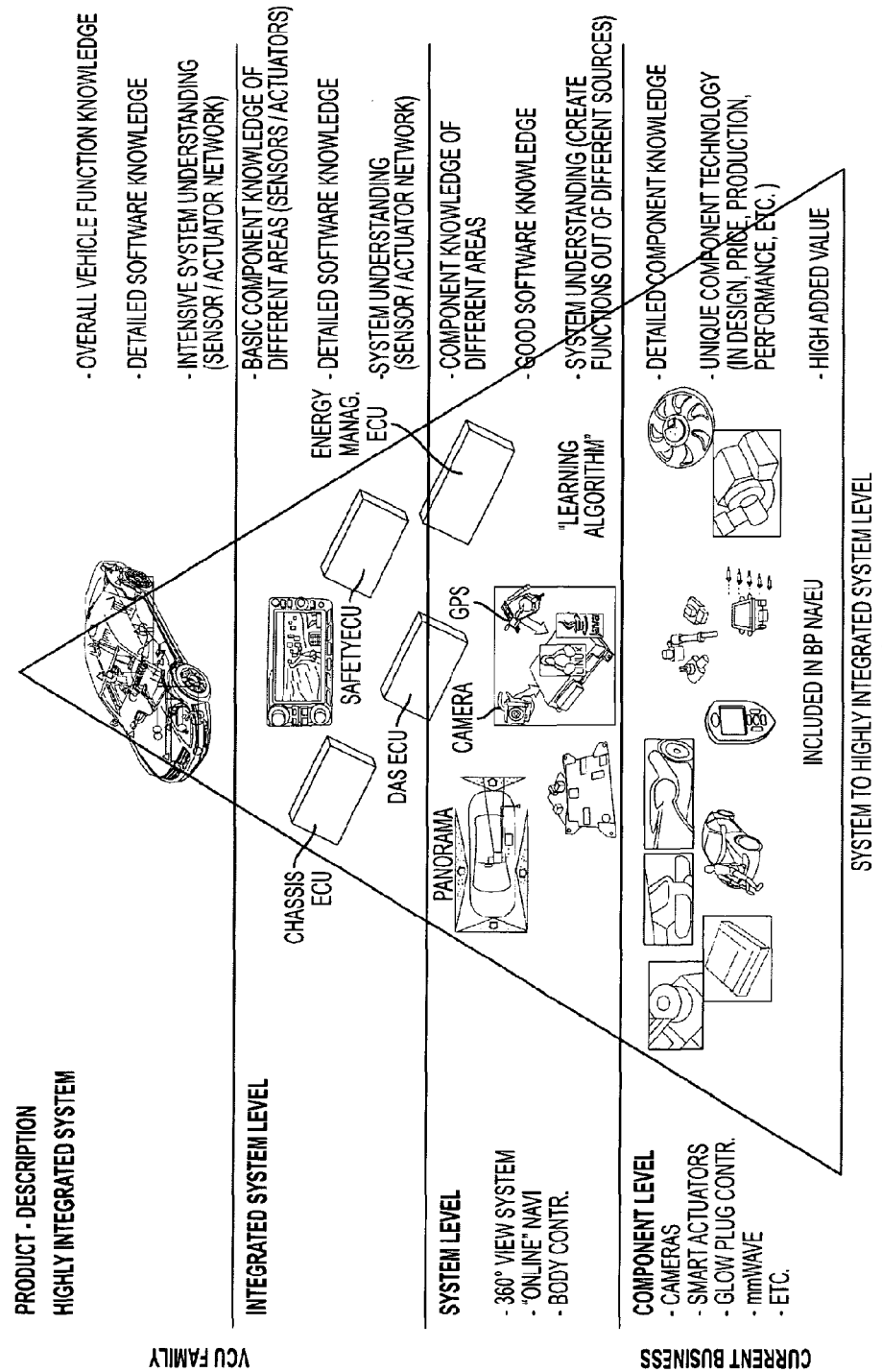
Figure 7:
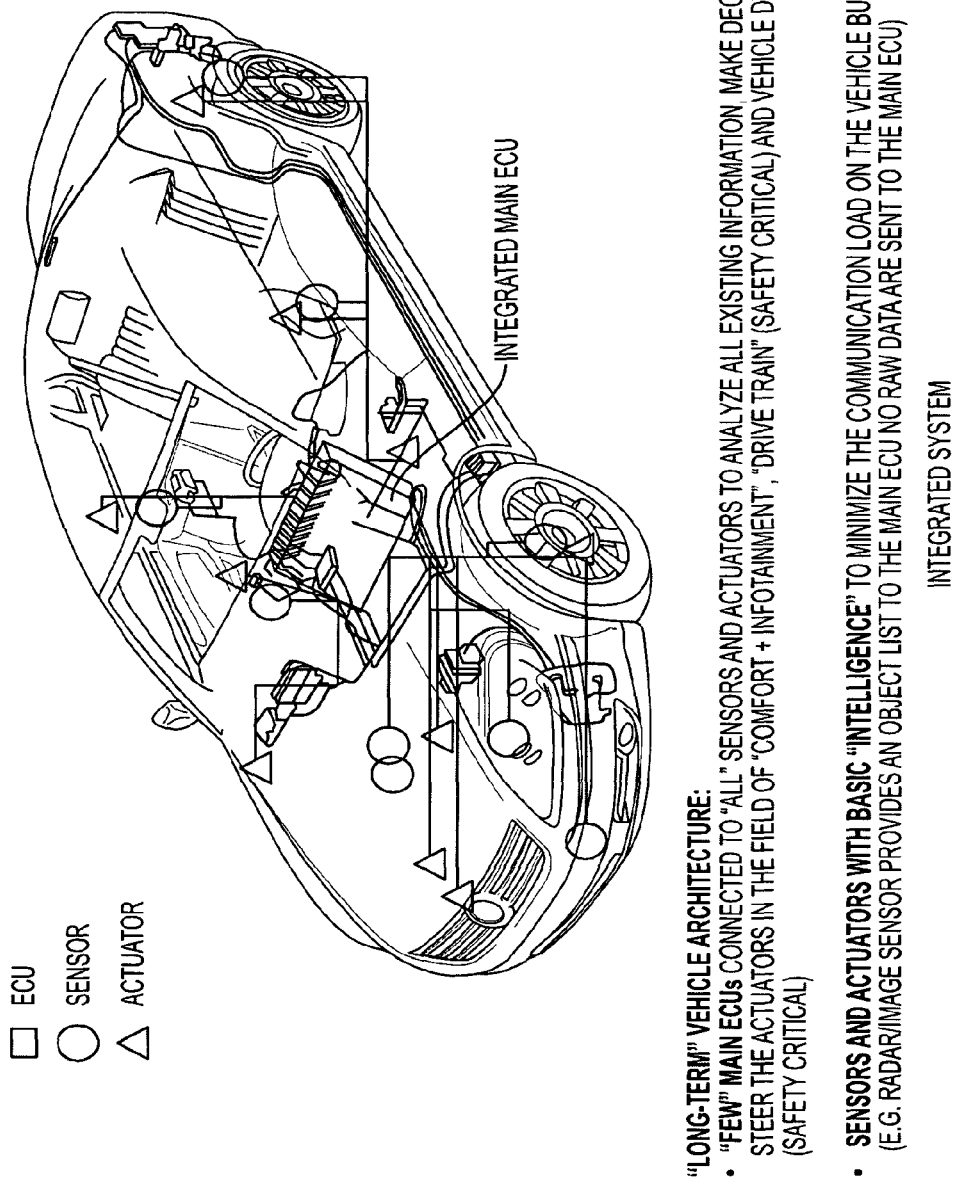
FIG. 7 is a perspective view and schematic of a vehicle incorporating an integrated vehicle control system of the present invention.

With reference to FIGS. 5-7, the vehicular scalable electronic control unit of the present invention is a scalable and integrated vehicle control unit that has the ability to host multiple core functions cost-effectively and has the ability to fuse these functions together to offer unique features that are not easily created with independent control modules. The control unit is scalable in that a common hardware architecture can be used to control multiple complex or simple functions. Customization may be provided for incorporation of functions from each system, but the common architecture will apply to each product in the control unit family. The scalable integrated electronic control unit is flexible in that functions from various vehicle subsystems can be hosted by control module, and the architecture may support any OEM and vehicle model. Also, the scalable integrated electronic control unit is flexible in that different levels/powers/types of processors may be integrated in or added to or associated with the vehicular scalable electronic control unit of the present invention, all under common system management. The scalable integrated electronic control unit is stable in that it is capable of running safety-critical functions, and its parallel processing capabilities enables redundancy for critical functions. Also, the scalable integrated electronic control unit of the present invention provides a low cost control system as compared to a vehicle equipped with equivalent functioned multiple independent processors and/or ECUs or controller (such as a Body ECU or controller, a Chassis ECU or controller, an Infotainment ECU or controller, a Head Unit ECU or controller and/or the like).

The vehicular scalable integrated control unit or module or system of the present invention thus provides a scalable generic vehicle control unit platform that supports consolidation of DAS, infotainment and chassis/body worlds/systems and that is open to host applications of different suppliers. The scalable integrated electronic control unit provides a single hardware and software architecture with plug-in capability for different software applications (such as, for example, easy adaptation of different navigation software packages), and may be operable to run safety critical vehicle functions. The scalable integrated electronic control unit or system thus allows for fewer ECUs in a vehicle equipped with the scalable integrated electronic control unit or system of the present invention, and thus provides an enhanced function to cost ratio. Because the system is a modular design, there is reduced development time and cost and a reduced piece price (because the system has the same basic components for all product lines). The openness of the platform supports integration of applications from different suppliers, and new or different applications and/or functions may be added without additional costs, based on the consolidation of DAS, infotainment, and chassis/body functions.

The scalable integrated electronic control unit or system of the present invention thus provides an operating system and software for determining which applications or programs or systems are to be controlled or processed, such as depending on a detected driving condition of the vehicle or the like. For example, the system may function to run only a few functions or may run many functions, depending on the particular driving condition or the like. The system may manage itself and continue running as the conditions change. The scalable integrated electronic control unit or system of the present invention thus provides a system with fewer ECUs (and thus reduced weight, reduced packaging concerns, fewer cables, and reduced costs to the vehicle), a reduced integration effort (and thus reduced development time, quicker product launch, enhanced stability and reduced integration risk), enhanced function to cost ratio (only one control unit or module versus multiple independent processors or control modules or units), and enhanced new features and applications (such as new features based on combined functions, enhanced aftermarket features or capabilities, a single integrated diagnosis unit and/or the like).

Figure 8:
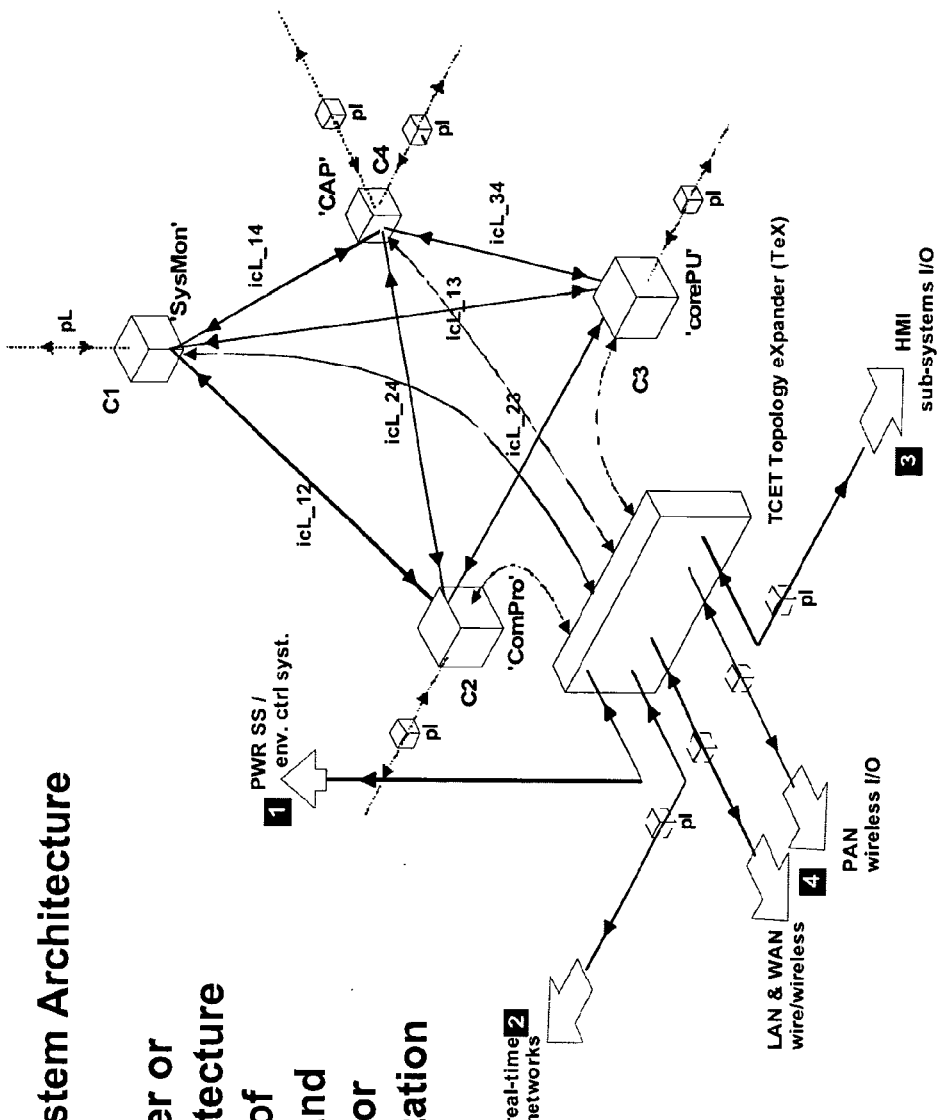
FIGS. 8 and 9 are schematics of a system architecture for a vehicle control system of the present invention.
Figure 9:
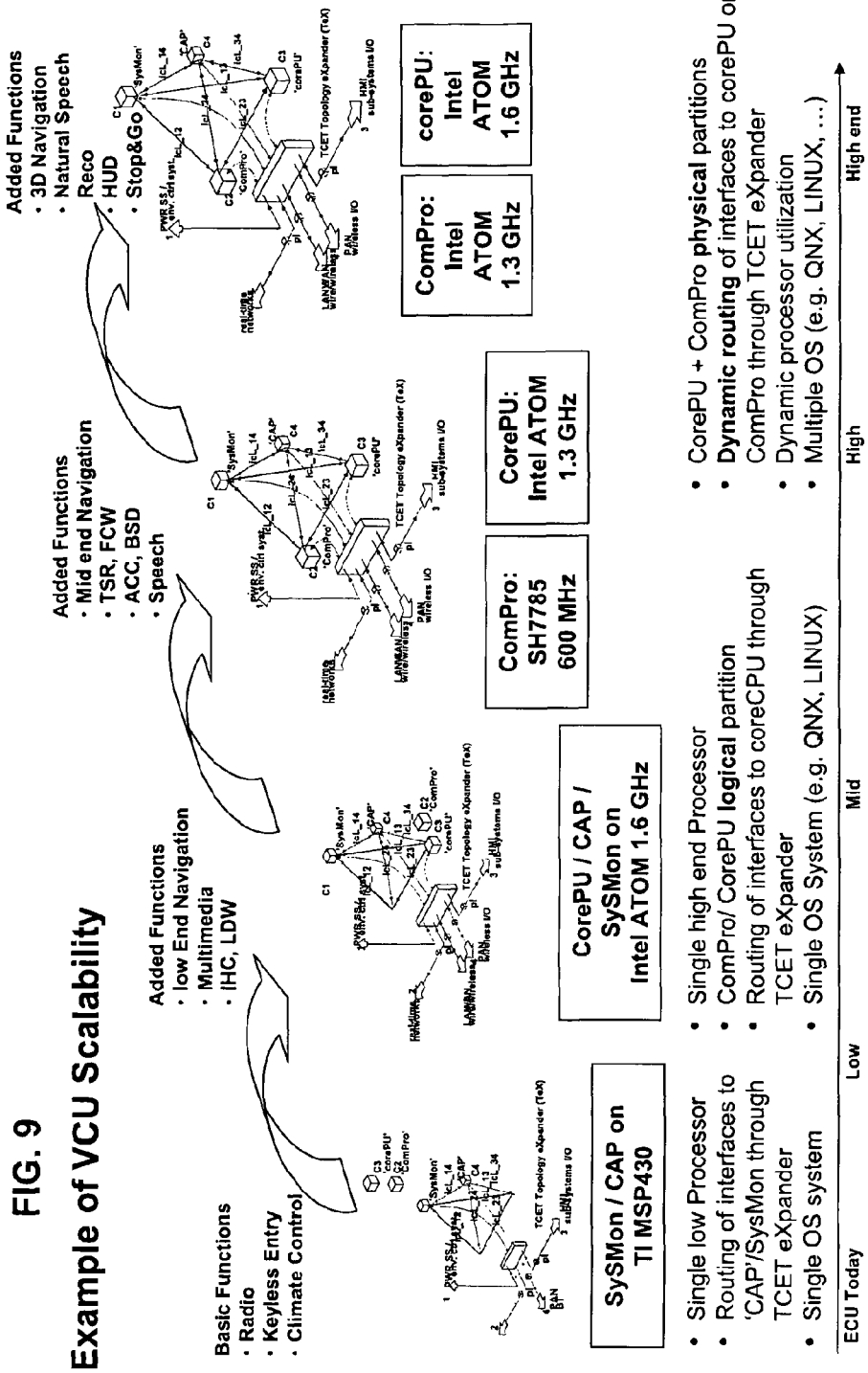
Figure 10:
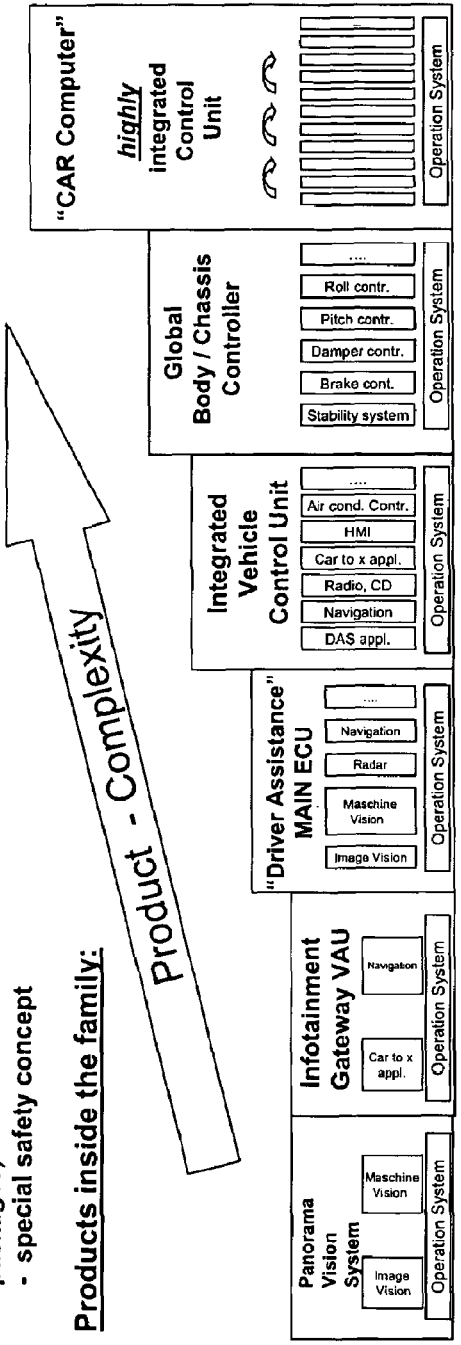
FIGS. 10-14 are schematics of examples of the control functions of the vehicle control system of the present invention.
Figure 11:
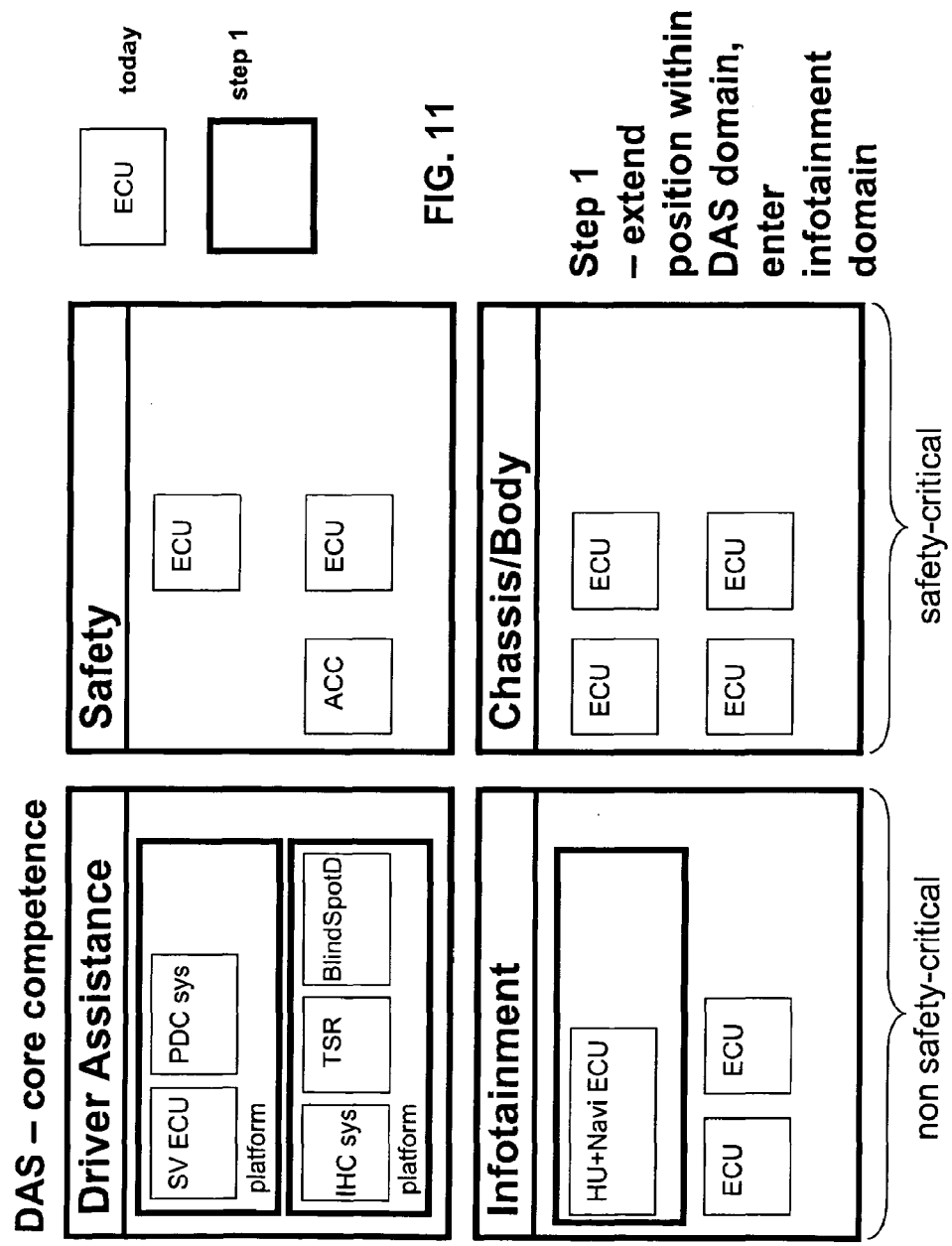
Figure 12:
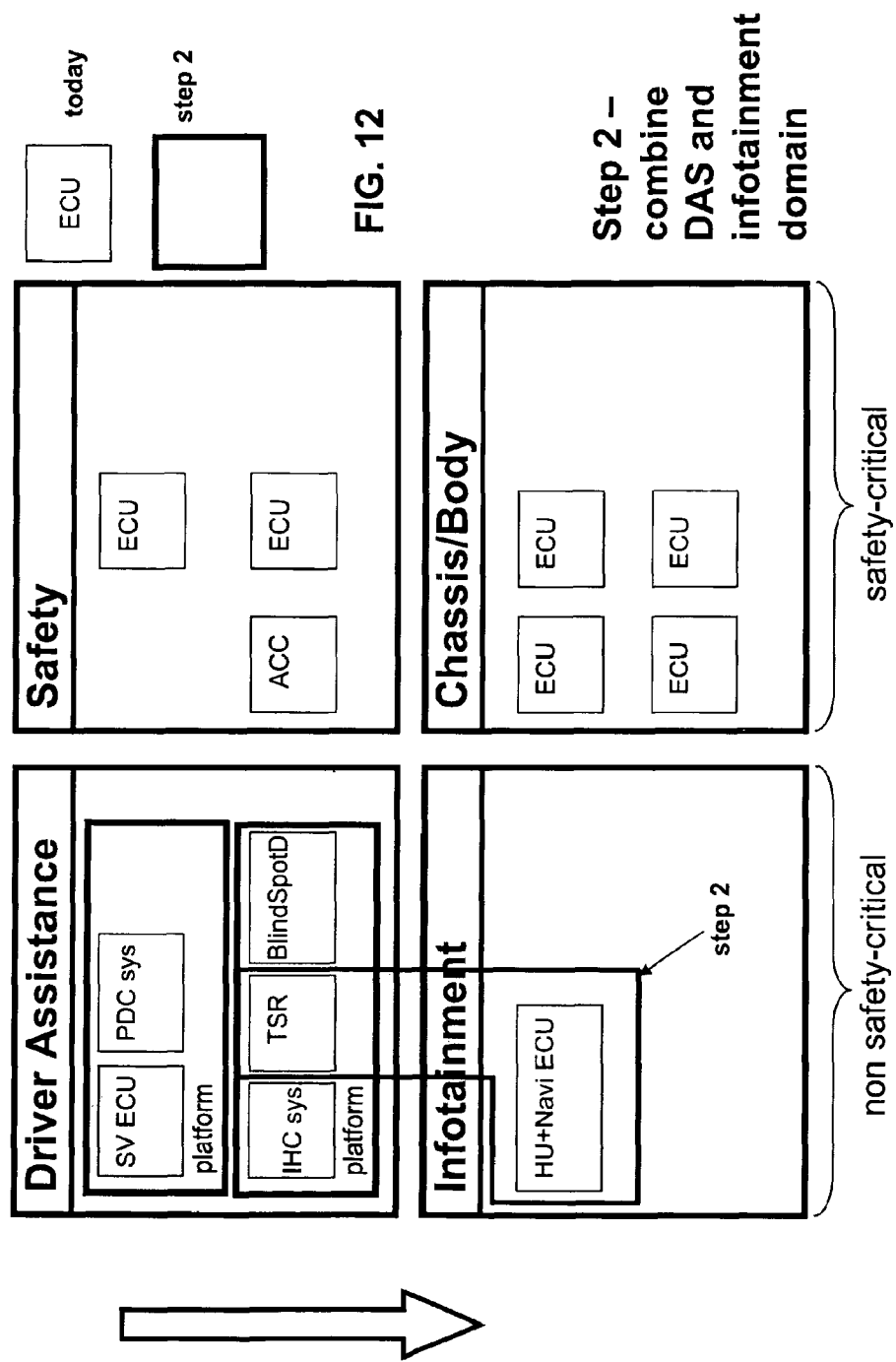
Figure 13:
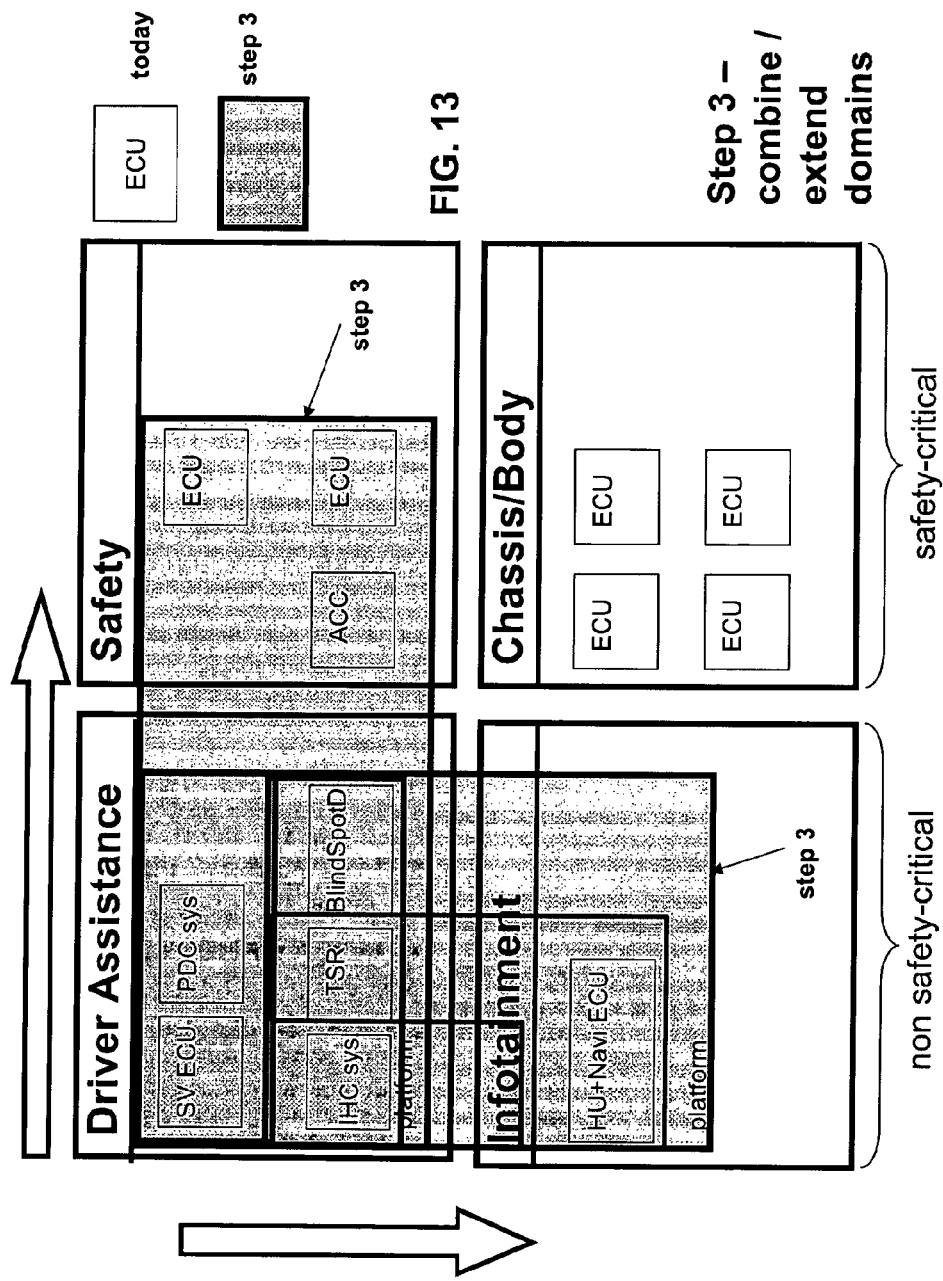
Figure 14:
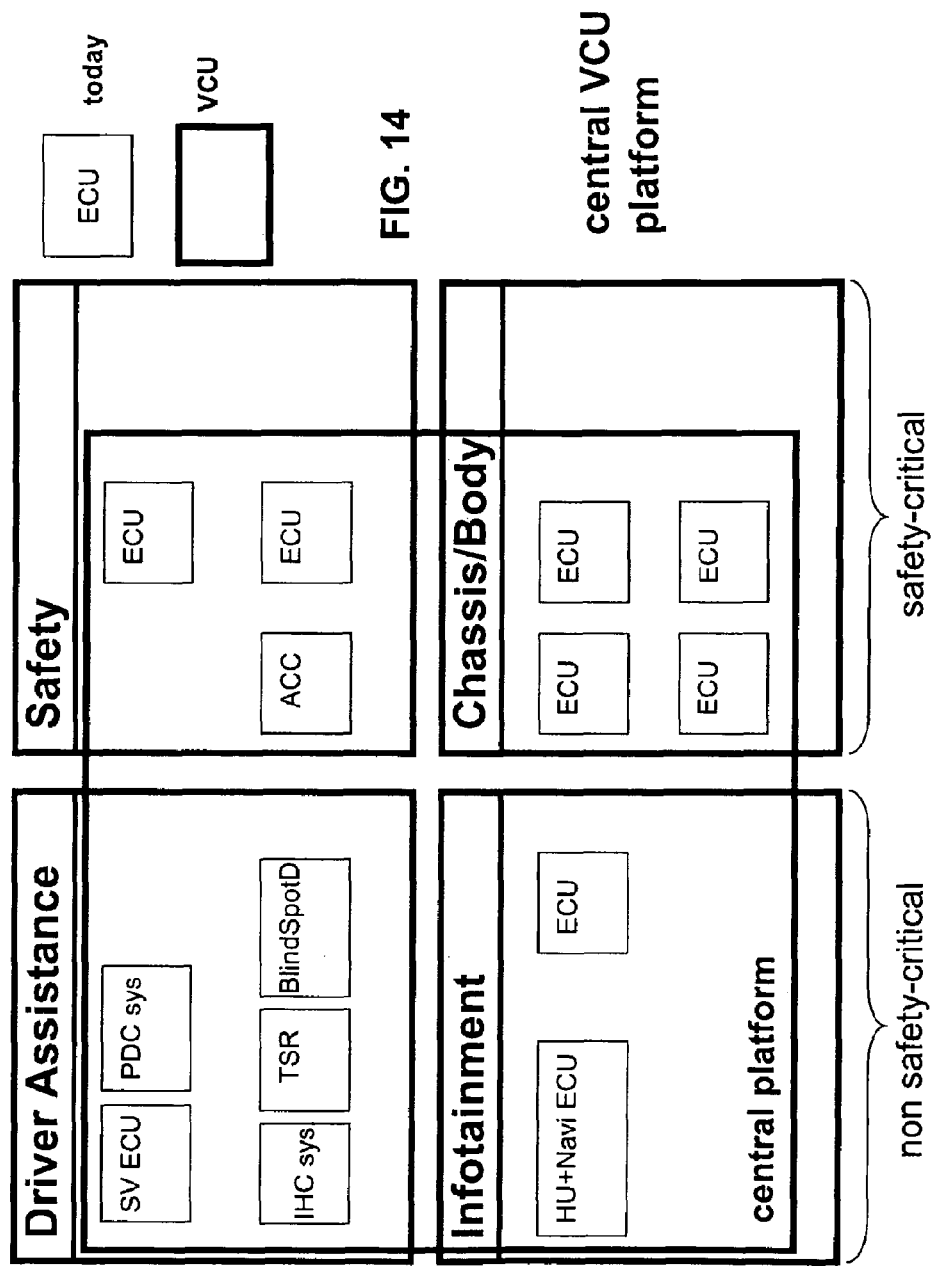
Figure 15:
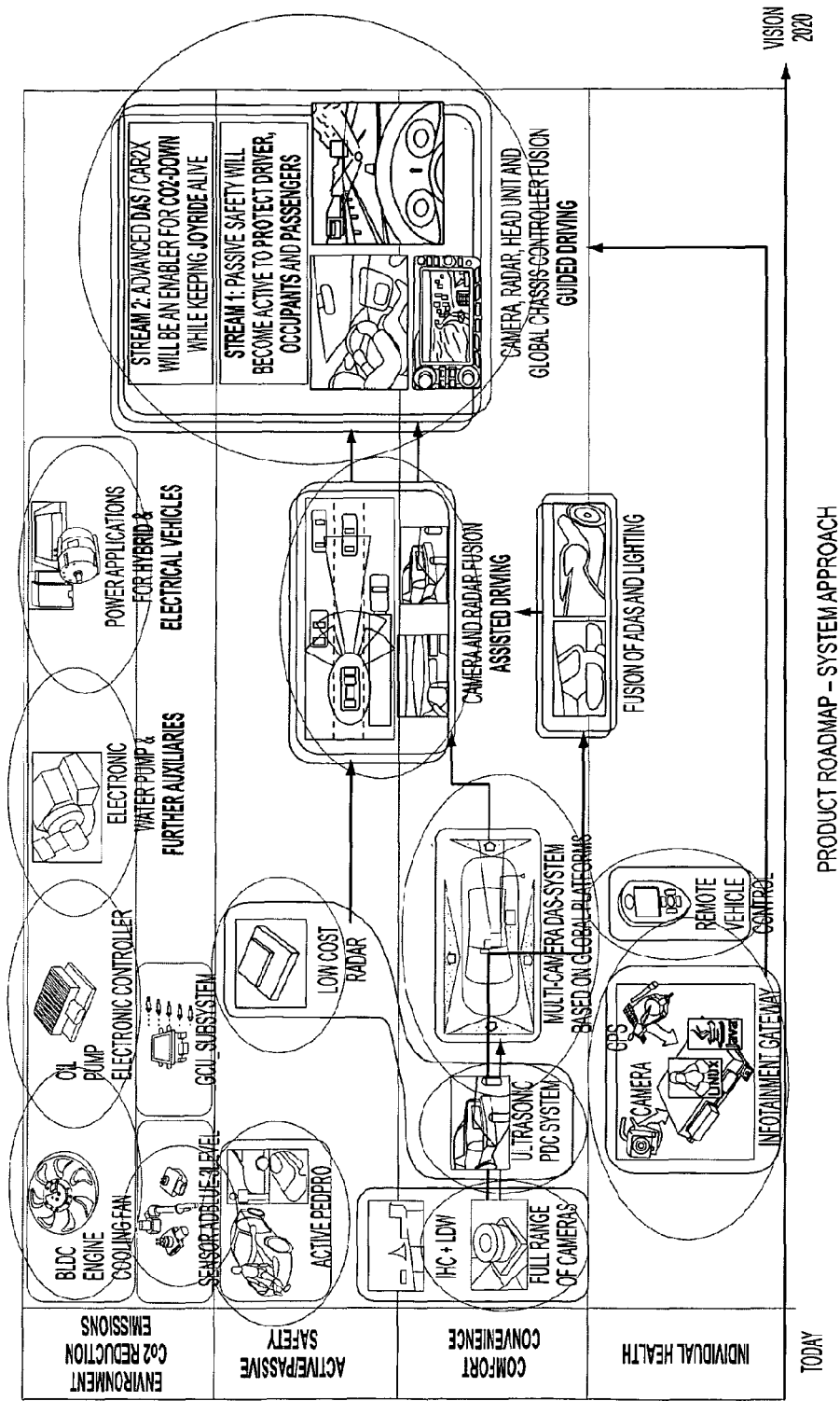
FIG. 15 is a schematic of various accessories and systems that may be incorporated into an integrated vehicle control system of the present invention.
Figure 16:
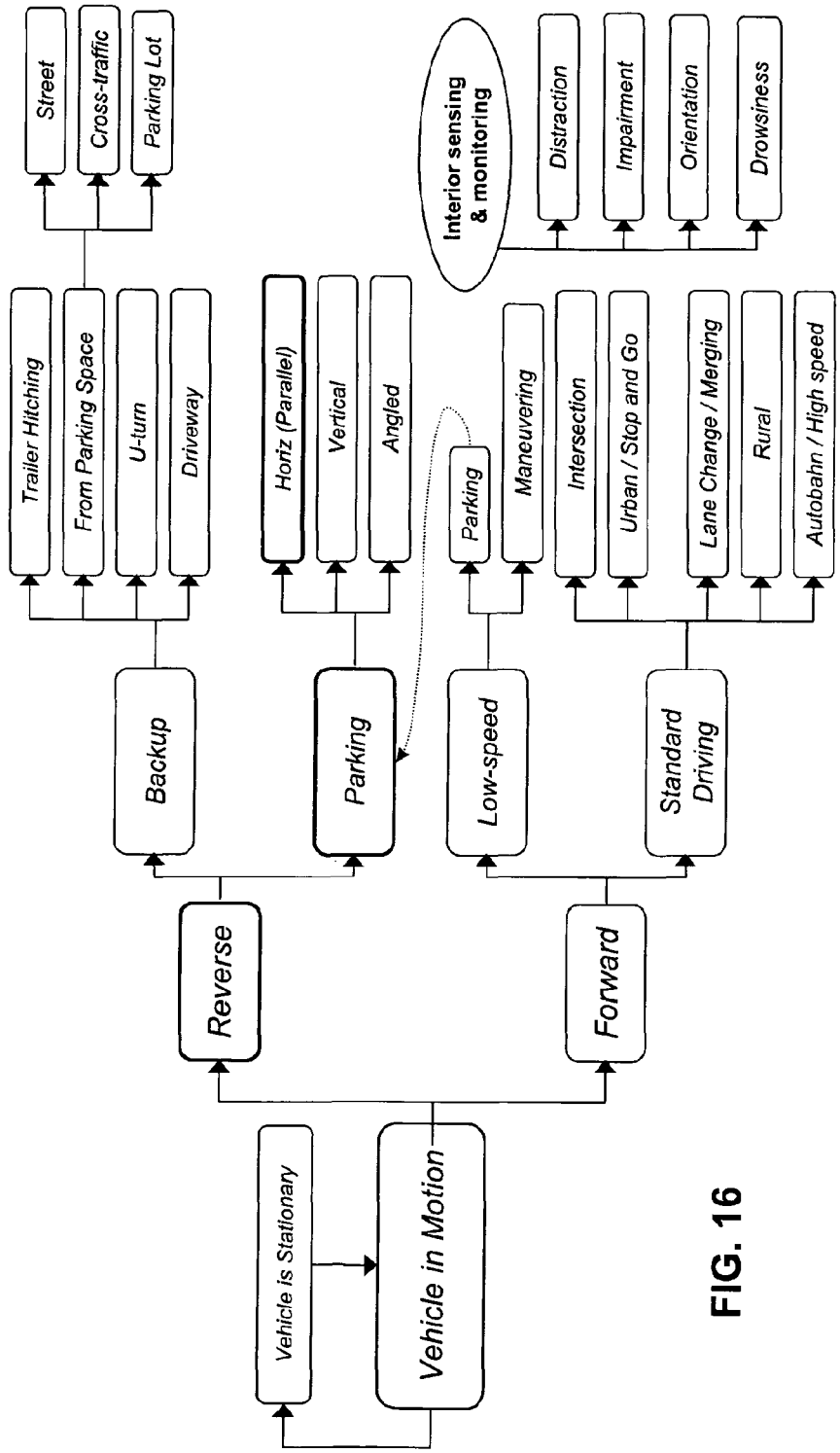
FIG. 16 is a schematic of vehicle driving segments or hierarchy for use by the integrated vehicle control system of the present invention.

With reference to FIGS. 8 and 9, the control system includes a system manager, such as a Tetrahedron Control Element Topology (TCET) expander ("TeX"), that provides system management and acts as a switch board for directing signals to the appropriate component and/or subsystem and/or control. Examples of such TCET expanders and/or protocol and/or architecture are described in U.S. Pat. Nos. 6,292,718; 6,654,910; 6,628,441; 7,140,026; 5,752,065; 6,952,782; 6,571,136; 7,349,844; and/or 6,950,312, and/or U.S. Pat. Publication No. US2008/115013, published May 15, 2008, and/or European Pat. Nos. EP 1 579 279 and EP 2 954 034; and/or PCT Publication No. WO 02/095581, published Nov. 28, 2002, which are all hereby incorporated herein by reference in their entireties. The system manager or TCET system architecture facilitates enhanced system scalability and variability to allow for component reduction or minimization.

The system manager allows for scalability of the system. The system includes a Communication Access Point (CAP) that is the communication gateway for all system components including physical Firewalls and integration of external communications into a single component (such as, for example, CAN Class B/C, Most, LIN, UART, SID, LVDS, Camera Link, HMI Output—"TCET eXpander"). The CAP provides a true car gateway function using the bundled inputs and outputs. The system also includes a logical and physical separation of realtime (ComPro) and non-realtime (CoreCPU) processing. The hardware scales independent of clustered functionality using hardware/software abstraction layers, where the system may have scale in the number of processors, scale in the processor type and variety (such as logical/physical CPU, ATOM, SH4, and/or the like) and/or scale in computing power (such as changes in processing speed and/or memory of the processors). The implementation of an independent system monitor (SysMon) allows the system to monitor the complete system functionality via a TCET interlink, and allows the system to control the load balance of the associated CPUs, and allows the system to swap the functionality between logical/physical CPUs for high system availability. The interlinking of all of the relevant system components thus provides enhanced processing and control with a single control module.

For example, and with reference to FIG. 9, for a vehicle with basic functions, such as radio, keyless entry and climate control, the system may include a single low processor (such as a TI MSP430 with a SysMon and CAP on the processor) and may route the interfaces through the system manager or TCET expander to the SysMon and CAP. If additional functions are added to the vehicle or system, such as, for example, a low end navigation function or system, a multimedia function or system, an automatic headlamp control function or system and/or a lane departure warning function or system, then the system may include a single high end processor (such as an Intel ATOM 1.6 GHz processor with a CorePU, a CAP and a SysMon on the processor and with a ComPro/CorePU logical partition), and the system may route the interfaces to the core CPU through the system manager or TCET expander. If further additional functions are added to the vehicle or system, such as, for example, a mid-end navigation function or system, a traffic sign recognition function or system, a forward collision warning function or system, an adaptive cruise control function or system, a body side detection function or system, a speech recognition function or system, and/or the like, the ComPro may comprise an upgraded ComPro (such as an SH7785 600 MHz ComPro) and the CorePU may comprise an upgraded or separate CorePU (such as an Intel ATOM 1.3 GHz CorePU) to provide the enhanced processing capabilities. Optionally, if further additional functions are added to the vehicle or system, such as, for example, a 3D navigation system, a natural speech recognition function or system, a heads up display, a Stop&Go function or system, and/or the like, the ComPro may comprise an upgraded ComPro (such as an Intel ATOM 1.3 GHz ComPro) and the CorePU may comprise an upgraded or separate CorePU (such as an Intel ATOM 1.6 GHz CorePU), and the processor may include CorePU and ComPro physical partitions, with the system providing dynamic routing of interfaces to the CorePU and ComPro through the system manager or TCET expander to provide the enhanced processing capabilities and dynamic processor utilization (and the system may have multiple operating system capabilities).

The scalable integrated electronic control unit or module or system thus allows for the vehicle manufacturer or an aftermarket supplier to provide different applications for performing different functions, without requiring a new or additional processor. For example, a desired application or applications may be downloaded (such as from the INTERNET by a consumer or by a technician at a car dealership/car service center or via a telematics system of the vehicle by the driver/car owner himself or herself) to the scalable integrated electronic control unit or module or system as desired. Optionally, and such as via a telematics system of the vehicle, and when selected by a driver of the vehicle while driving or when automatically triggered such as for a particular driving situation and/or geographical location of the vehicle (that automatically is determined by a GPS system of the equipped vehicle), the scalable integrated electronic control unit may operate to access or run the downloaded application or applications at an appropriate time or in response to a detected driving condition or the like. The system thus may have programs from different sources, and the programs may be fed to the TCET expander, whereby information that is important for the selected or appropriate processing may be extracted from the programs and routed to the appropriate processor or accessory or the like. As shown in FIGS. 10-21, various systems and/or subsystems and/or accessories may be integrated into the control system of the present invention, with the scalable integrated electronic control unit providing an integrated control unit or vehicle control unit or module.

Figure 17:
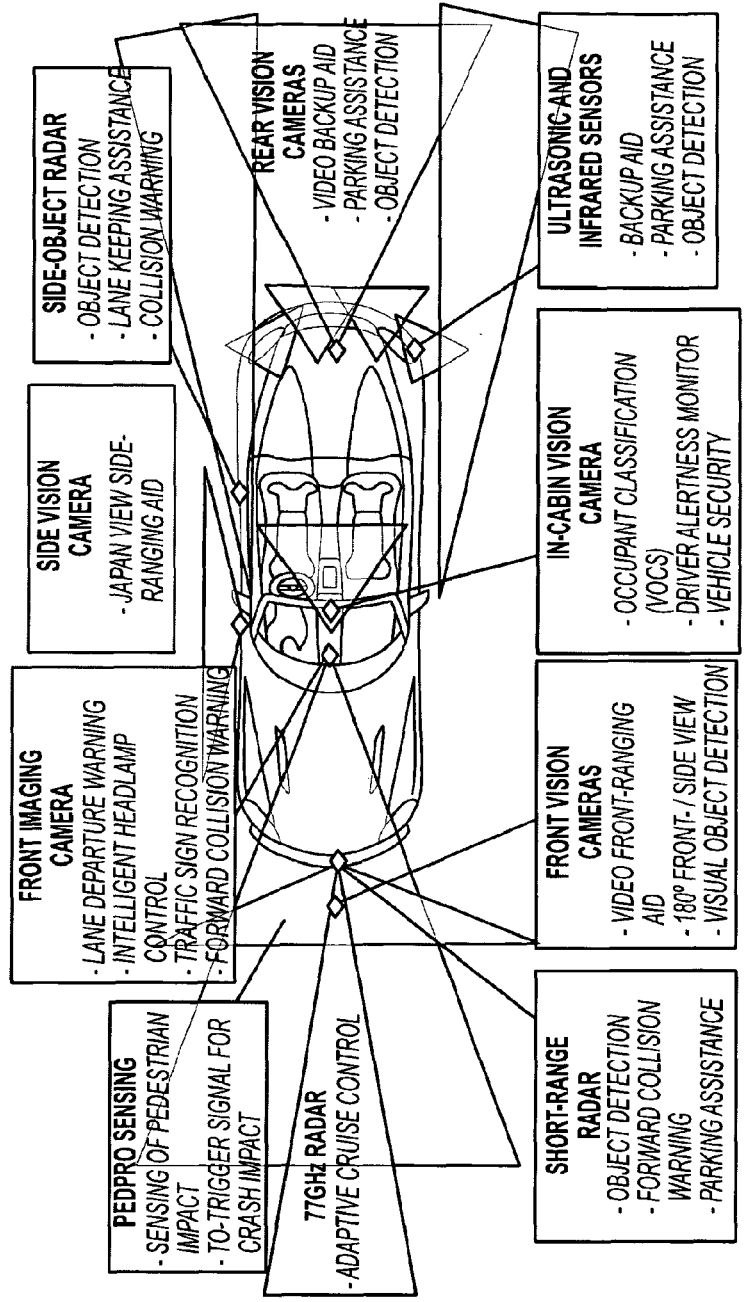
FIG. 17 is a top plan view of a vehicle and a schematic of an integrated vehicle control system of the present invention, incorporated into the vehicle.
Figure 18:
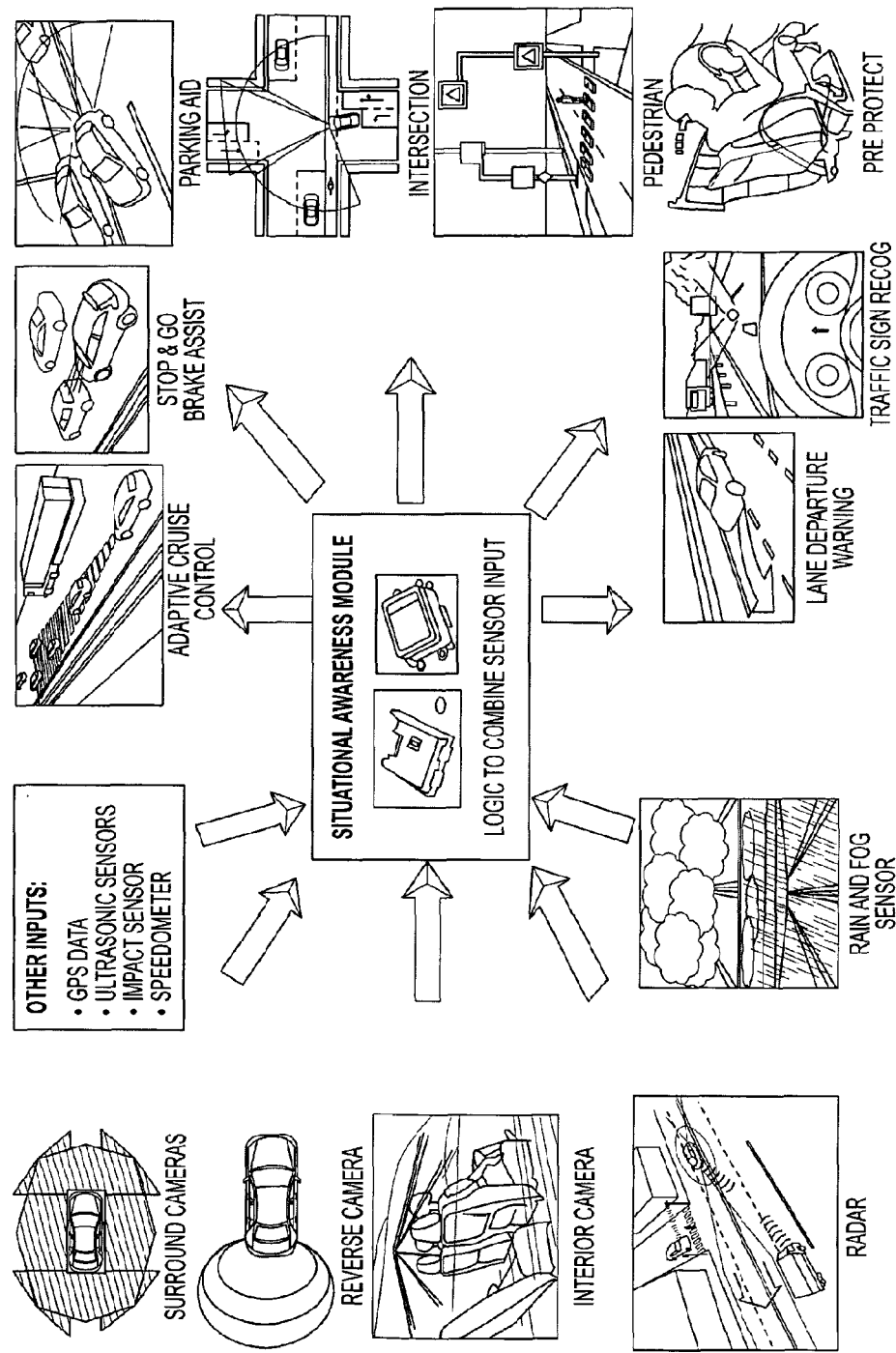
FIG. 18 is another schematic of a vehicle control system of the present invention, showing various inputs to the control.
Figure 19:
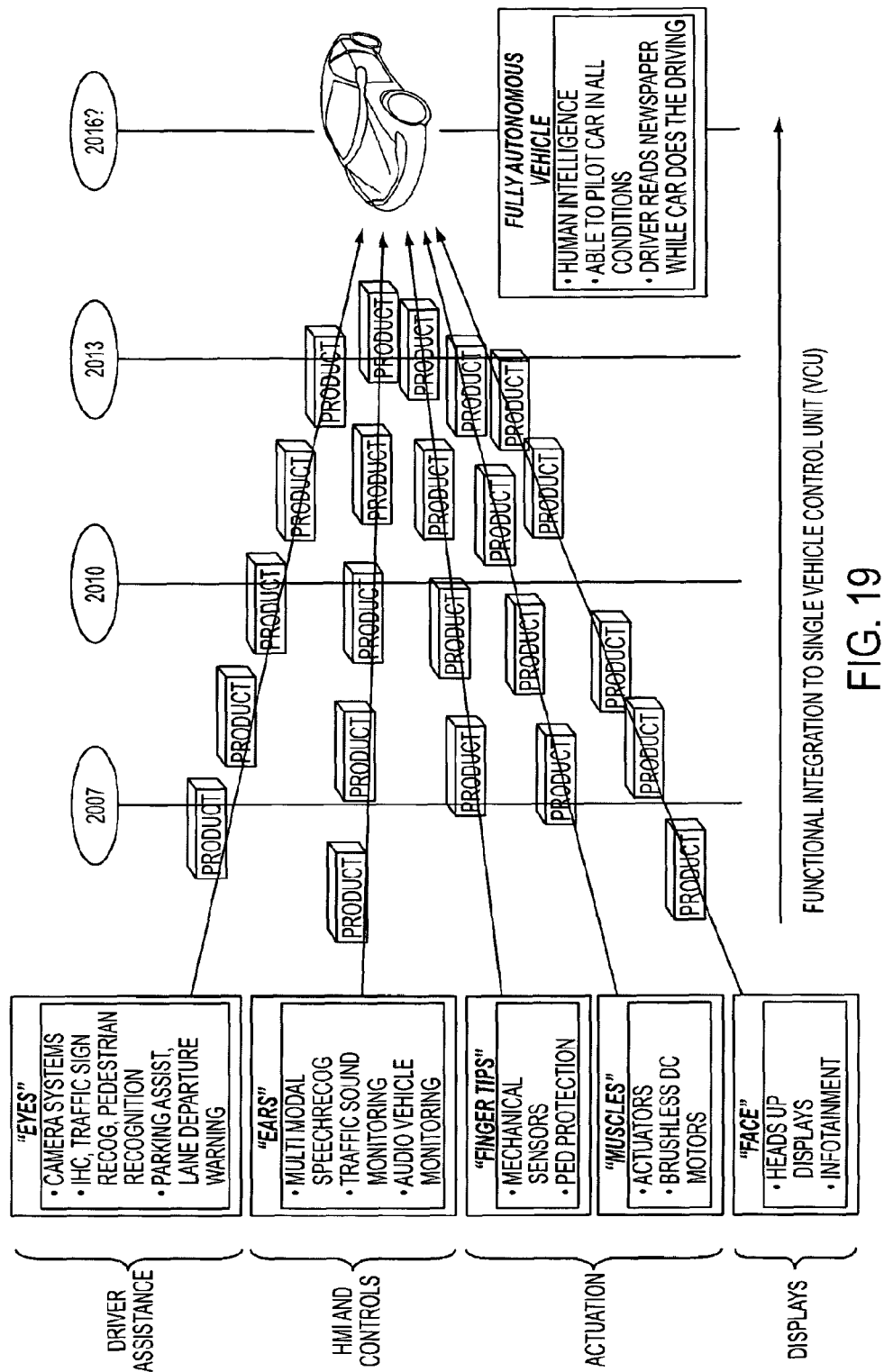
FIG. 19 is another schematic of a vehicle control system of the present invention suitable for use in a fully autonomous vehicle.
Figure 20:
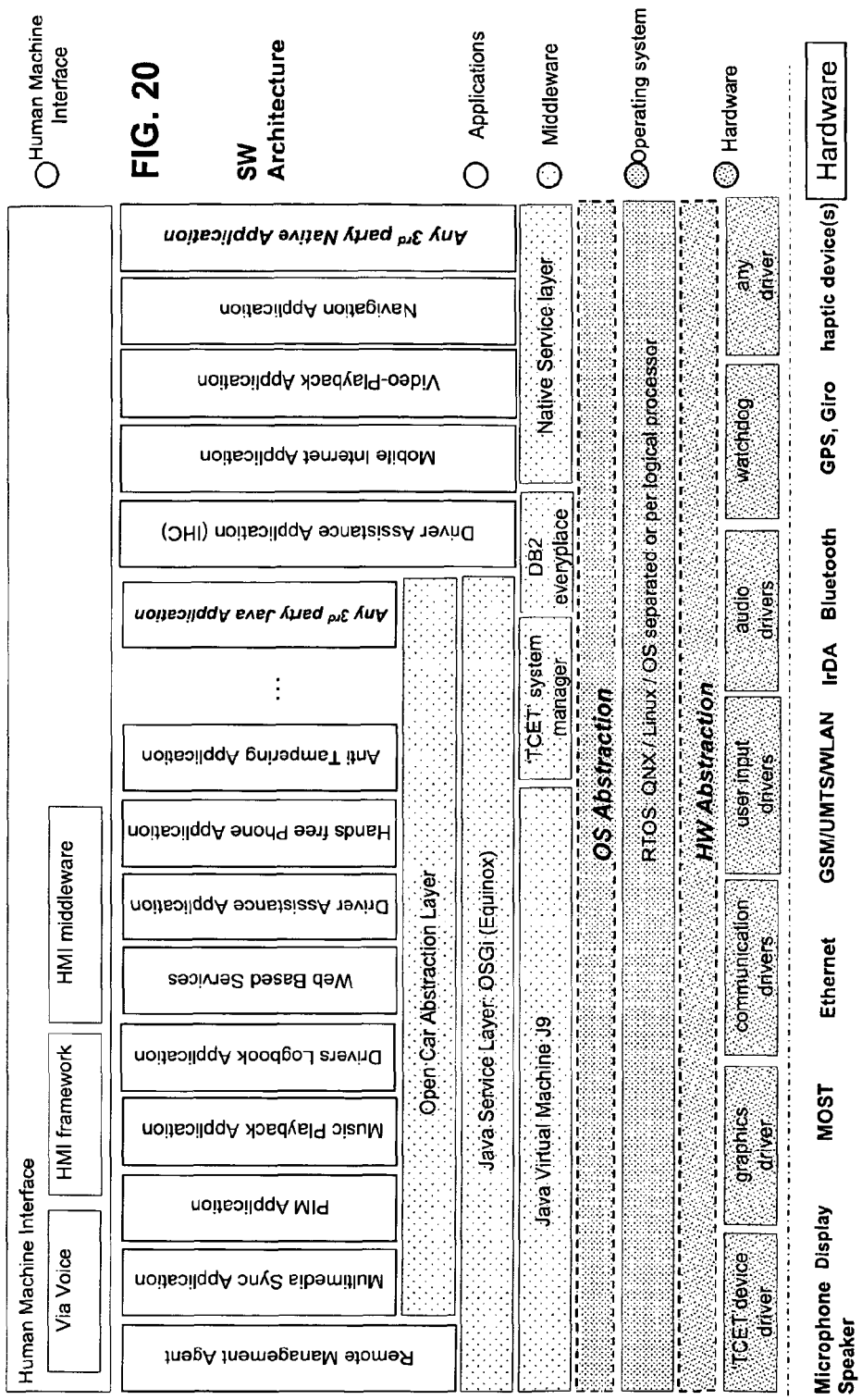
FIGS. 20-22 are schematics of the software architecture for the vehicle control system of the present invention.
Figure 21:
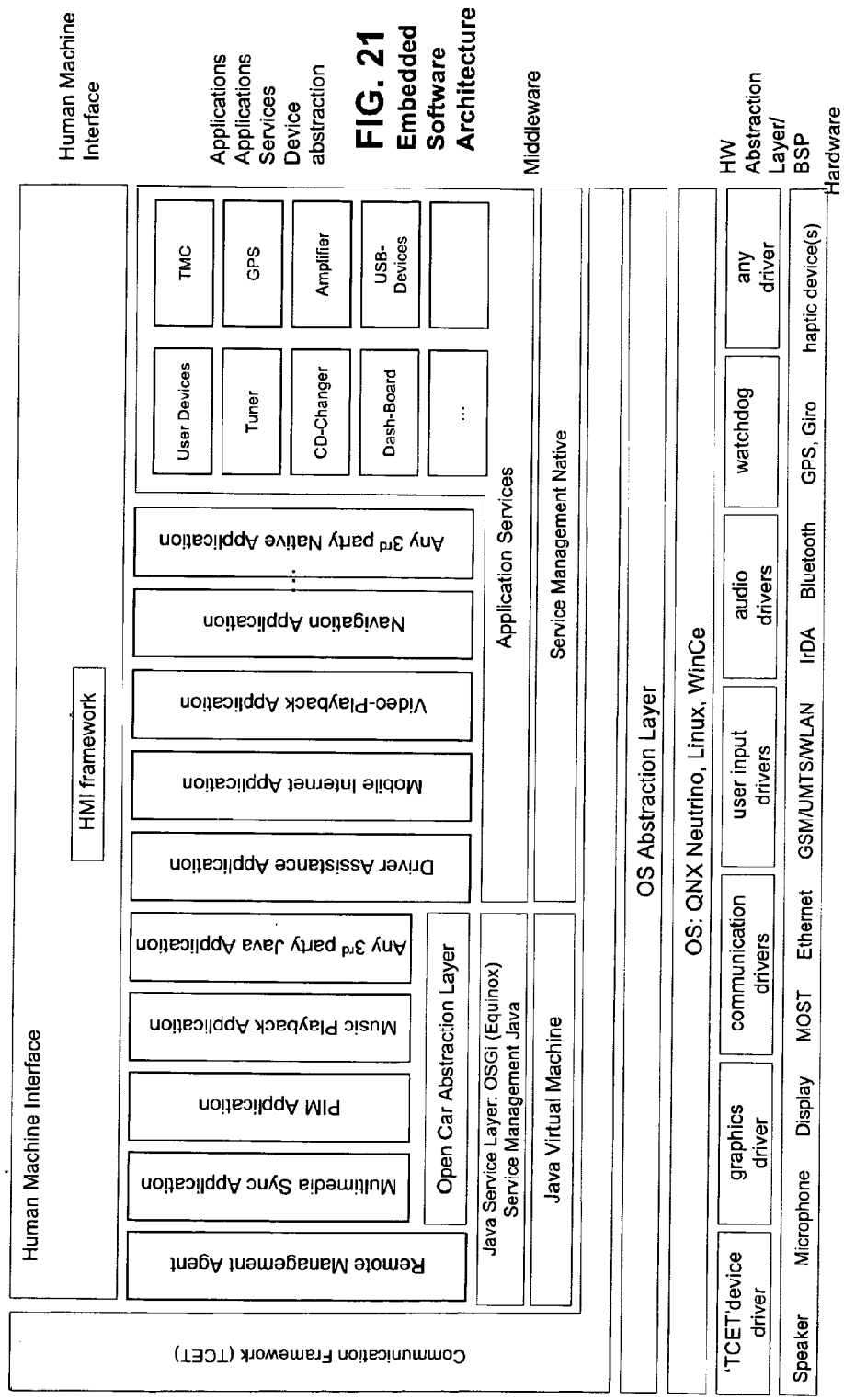
Figure 22:
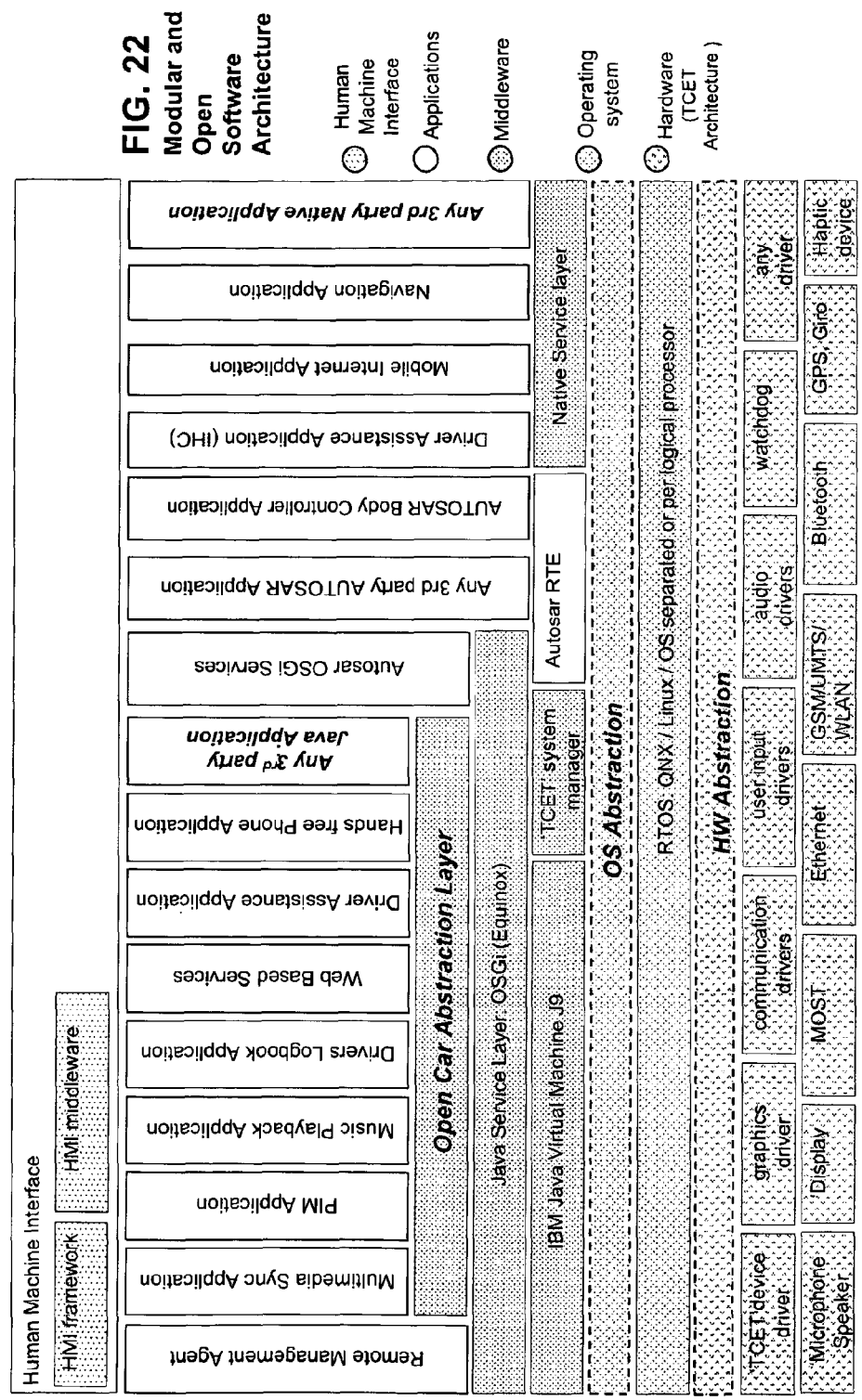

For example, the vehicular scalable electronic control unit or system or situational awareness unit or module or system can be particularly used in an overall driver assistance and safety system as illustrated in FIGS. 17 and 18. As further applications and systems and subsystems are developed and integrated into the vehicular scalable electronic control unit, it is envisioned that the vehicular scalable integrated control unit of the present invention may be suitable for controlling functions of an autonomous vehicle, such as illustrated in FIG. 19. Various software and software architecture may be implemented in or associated with the vehicular scalable integrated control unit, such as illustrated in FIGS. 20-22.

Optionally, for example, the control system may include an automatic headlamp control function, a traffic sign recognition function, a back up assist function and/or the like, responsive to various image sensors (such as a forward facing sensor and rearward facing sensor) and non-imaging sensors or the like. The system may analyze various inputs or vehicle status conditions to determine the type of driving that the vehicle is undergoing, and may adjust the processing in response to such a determination. For example, if the system determines that the vehicle is undergoing a reversing maneuver, the system may limit or inhibit processing of the captured images from the forward facing camera, since they are not as relevant for a reversing maneuver. Likewise, if the system determines via inputs from sensors/equipment in the vehicle that the vehicle is traveling in a forward direction, the system recognizes that there is no need to have the processor process images from the rearward facing camera and that there is no need to even have the rearward facing camera operating to be available for processing when the vehicle is in a forward gear. Thus, the system may detect the vehicle driving situation (such as driving forward, driving in reverse, driving up a hill or mountain, driving down a hill or mountain, driving around a curve in the road, daytime driving, nighttime driving, driving at a particular geographical location, and/or the like), and may adjust its processing accordingly. Thus, a single scalable integrated electronic control unit or module may function to provide a plurality of independent functions without requiring costly high end or high powered processing capabilities and the like.

Optionally, for example, a navigation application may be downloaded (such as via a telematics system of the vehicle when selected by a driver of the vehicle, such as for a particular driving situation and/or geographical location of the vehicle) for a particular region or locale that the vehicle is to be traveling in or through. Then, when a GPS system of the vehicle detects that the vehicle is at a particular geographical location, the scalable integrated electronic control unit may download the appropriate maps or information associated with that location, or may provide (such as via an audible system or video display or the like) information to the driver of the vehicle about the geographical location at which the vehicle is located.

Figure 23:
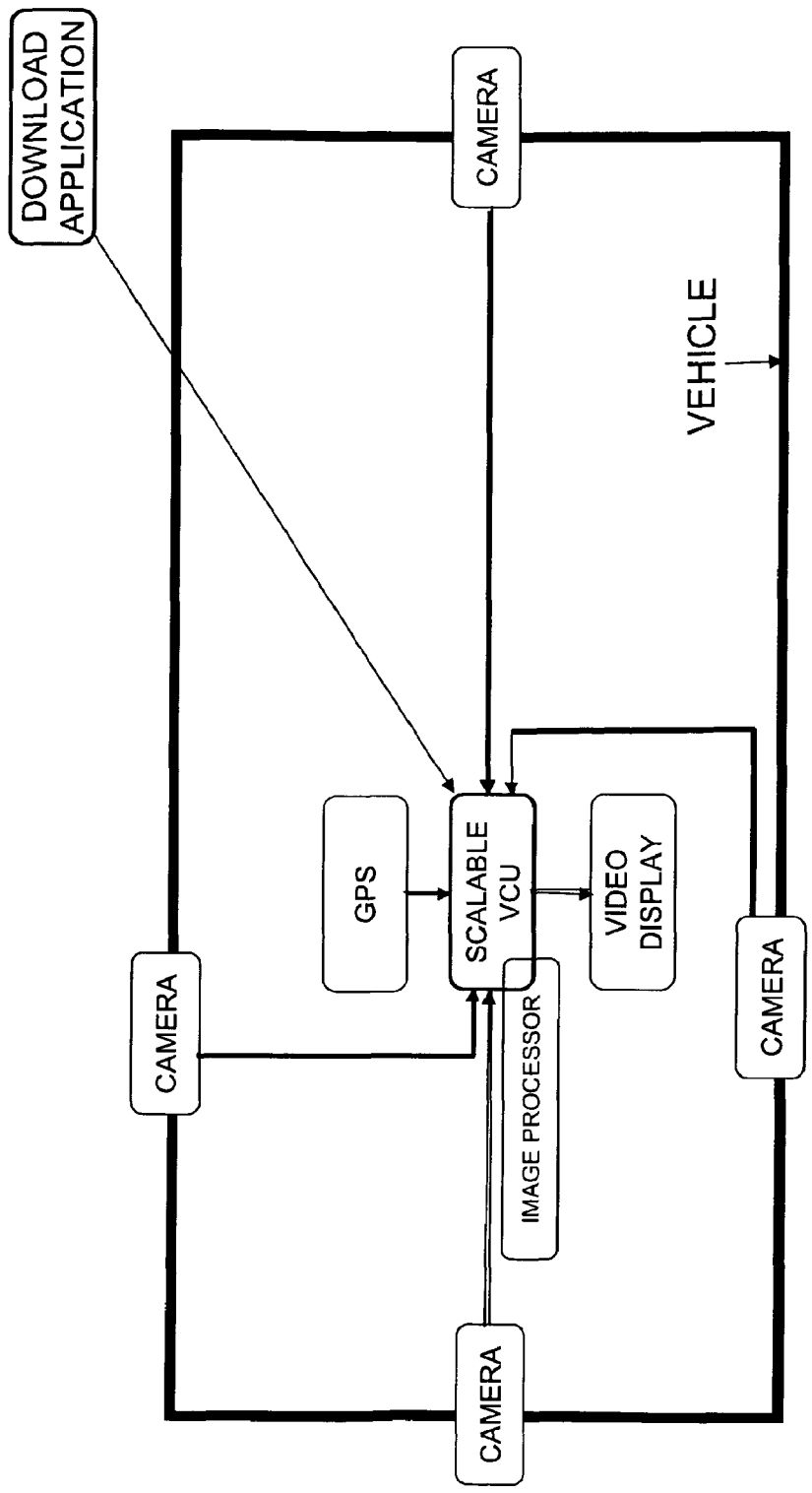
FIG. 23 is a block diagram of another vehicle control system of the present invention.

For example, and with reference to FIG. 23, a vehicular scalable integrated control system for a vehicle may include a plurality of cameras having respective fields of view exterior of the vehicle (such as a forward facing camera, a rearward facing camera and one or more sideward and/or rearward facing cameras), and a vehicular scalable integrated control unit. The vehicular scalable integrated control unit includes an image processor, and visual image data captured by the cameras is processed by the image processor of the vehicular scalable integrated control unit to detect objects in the fields of view of the cameras. A display screen for displaying video information to a driver of the vehicle is operable to display information responsive to the vehicular scalable integrated control unit. The vehicular scalable integrated control unit is responsive to a global positioning system of the vehicle to determine a current geographical location of the vehicle. The vehicular scalable integrated control unit accommodates downloading of applications, which may include a tour guide application (for example, if a driver is planning to visit a tourist attraction area, such as, for example, Washington, D.C., the driver may download a Washington, D.C. tour guide application to provide him or her with maps and points of interest at the tour area). The tour guide application provides information associated with various geographical locations of a selected tour area. The vehicular scalable integrated control unit, responsive to a determination by a GPS system of the equipped vehicle that the current geographical location of the vehicle is at a location identified in the tour guide application for the selected tour area, controls the display screen to display information associated with the identified location of the tour guide application and the current geographical location of the vehicle and/or audibly narrates points of historical, entertainment or commercial interest associated with the building or site or landmark or the like being approached/passed. A video image of a historical building being capture by a forward facing camera can be highlighted/annotated to draw the driver's/occupant's attention to what is being approached/passed. Optionally, the vehicular scalable integrated control unit may be operable to access and/or process the tour guide application responsive to a determination that the current geographical location of the vehicle is approaching the selected tour area.

Thus, when the vehicle is driven at or through the tour area associated with the downloaded tour guide application, the display screen displays information responsive to the vehicular scalable integrated control unit and the GPS, with the displayed information being associated with the selected tour location of the tour guide application and the current geographical location of the vehicle. For example, as the vehicle approaches or is at the tour area (such as Washington, D.C.), the control unit may automatically access and process or run the tour guide application for that area and may display pertinent information on the display screen as the vehicle is driven through the tour area. For example, as the vehicle is driven past the White House, the control unit may (responsive to a detection of that current geographical location of the vehicle) automatically display information about the White House such as a video of the White House being captured by a forward-facing camera of the equipped vehicle (along with audible information as well) so the driver and occupants of the vehicle can readily identify the White House and see or hear additional information about the White House as the vehicle approaches or is driven past the White House, or a video downloaded from the INTERNET from the likes of Google Street View (http://maps.google.com/help/maps/streetview/) can be displayed as the equipped vehicle approaches the actual building/site, with the display of the video synchronized to the actual geographic position and approach of the equipped vehicle.

The vehicular scalable integrated control unit thus provides flexible customization of the control unit to provide a consumer-attractive tour guide feature or function, whereby the driver may purchase and download the desired tour guide application (including maps and information) such as from the INTERNET using his/her PDA or cell phone or the like or via a vehicular telematics system such as SYNC™ or ONSTAR®, and may select (and authorize/pay for) the type of information or type of tour (e.g., a points of interest type of tour or a historical information type of tour or a scenic type of tour or the like), and the control unit or system automatically accesses and runs the application when it is determined that the vehicle is at or approaching the selected tour guide area (or in response to a user input or the like). The driver and occupants of the vehicle can then take a self driven tour of the selected tour area while automatically receiving information on the various points of interest that they pass during the tour and receiving such information at the time that the vehicle is actually present at or approaching or driving past that particular point of interest.

The vehicular scalable integrated control unit thus performs situational processing to determine the driving conditions (such as forward/reverse/uphill/downhill and/or weather conditions and/or fuel capacity or driving range or the like) and/or the current geographical location of the vehicle and/or the like, and may access and run or control the appropriate application and/or accessory responsive to such a determination. Optionally, for example, a fuel conserving program or application may be downloaded to the processor or system, whereby when the system detects that the vehicle is low on fuel (such as low on gasoline or low on battery power for an electric vehicle), the system may provide hierarchical situational analysis and decision making to provide enhanced fuel economy while the fuel or energy level is low. For example, the system may, in response to a low fuel/energy/power detection, function to control the HVAC system of the vehicle, such as to shut down the air conditioning to conserve energy. Optionally, for example, the system may inhibit or limit such controlling or shutting down of the HVAC system if the system also determines that there is fog on the interior surface of the windshield (such as responsive to a rain sensor or imaging sensor or the like at or near the windshield of the vehicle). The system dynamically analyzes the inputs and conditions and makes the decision based on the hierarchical analysis. For example, at first, the importance is on getting to a gas station or charging station or the like without running out of fuel, so the system may shut down any accessory or system that may be a drain on the vehicle power, but if that accessory is at that time needed (such as an AC function to defog the windshield for safer driving), then the system may limit or inhibit shutting down that system and may look to shutting down other accessories or systems or controlling the engine performance or the like to enhance the fuel economy of the vehicle until it is refueled or recharged.

The vehicular scalable integrated control unit may allow an automaker to flexibly and freely centralize the computer/algorithmic processing of features and applications that conventionally are processed in isolation, and further allows and enables selection by the automaker of a preferred or specialized or more affordable software supplier that may be independent of the supplier of the vehicular scalable integrated control unit and/or the various sensors/controls/subsystems/systems/accessories that provide and/or receive data or I/O control thereto or therefrom. Optionally, the vehicular scalable integrated control unit comprises a scalable DAS situational analysis vehicle integrated control unit that also provides control of functions or systems or accessories of the vehicle, and that can accommodate and run consumer-attractive applications. Such applications may be customized for or be appropriate for a particular type or brand or level of vehicle, or a particular type or level of driver and/or profile identity of the driver and/or occupants of the vehicle, or a particular driving situation and/or geographic location and/or traffic condition. For example, the vehicular scalable integrated control unit may run or accommodate such applications and may be responsive to the geographic location of the vehicle or a detected identity of the driver or occupants of the vehicle, such as by utilizing aspects of the systems described in U.S. Pat. Nos. 7,412,328 and/or 7,474,963, which are hereby incorporated herein by reference in their entireties.

The system thus provides dynamic situational processing to provide the appropriate function depending on one or more conditions of the vehicle and/or driver and/or vehicle location and/or weather conditions and/or the like. Optionally, the system may also function to mitigate problems that may arise in case of a malfunction of one or more accessories or subsystems. For example, if the system detects a problem or malfunction or error in a software application or hardware component, the system may dynamically shut down the malfunctioning application or component (such as a processor) and may use another application or component (such as another processor) to perform the desired or appropriate task or may share circuitry and/or components with other systems or subsystems or software to perform the desired or appropriate task.

Optionally, the vehicular scalable integrated control unit or module may be located in variety of locations at or in the vehicle. For example, the scalable integrated electronic control unit may be located at or incorporated in or associated with an infotainment element or system (such as part of a radio or navigation screen or a video display module or part of a video mirror assembly or the like). Optionally, the scalable integrated electronic control unit may be incorporated in or may be part of a windshield electronics module and/or an accessory module located at or near the interior rearview mirror assembly of the vehicle, or may be located at or in the interior rearview mirror assembly of the vehicle, while remaining within the spirit and scope of the present invention.

As discussed above, the vehicular scalable integrated control unit receives inputs from various exterior cameras and/or sensors, and outputs from the scalable integrated electronic control unit may be used for displaying captured video information on a video display screen. Thus, the scalable integrated electronic control unit may be associated with or may cohabitate with other units or systems or accessories associated with a video screen or imaging system of the vehicle. Because many other items or accessories or systems may generate information or outputs that appear on such a video screen, it is ripe to cohabitate or coassociate the vehicular scalable electronic control unit with such other accessories or system or component items that currently are associated with or use video screens of a vehicle (like navigation systems and the like). Thus, it is envisioned that the vehicular scalable electronic control unit of the present invention and these other systems or subsystems or accessories (such as an image processor, such as an EyeQ™ image processor or the like) may be brought into or associated with or located at the "Head Unit" of the vehicle using scalable integrated electronic control unit (or optionally elsewhere at or in the vehicle).

The cameras may communicate the captured image data to the scalable integrated electronic control unit via any suitable means. For example, the cameras may wirelessly communicate the captured image data to the image processor or may communicate via a wired connection or communication link or Ethernet cable or link. For economy, video image transmission via an Ethernet cable can be desirable, particularly when the individual video feeds from multiple video cameras disposed around the vehicle are being fed to a common image processor and/or electronic control unit and/or video display module or system. Optionally, for example, the connection or link between the image processor and the camera or cameras may be provided via vehicle electronic or communication systems and the like, and may be connected via various protocols or nodes, such as BLUETOOTH®, SCP, UBP, J1850, CAN J2284, Fire Wire 1394, MOST, LIN, FLEXRAY®, Byte Flight, LVDS and/or the like, or other vehicle-based or in-vehicle communication links or systems (such as WIFI and/or IRDA) and/or the like, depending on the particular application of the mirror/accessory system and the vehicle, and may be compatible with standard vehicle protocols/conventions such as are provided by the likes of AUTOSAR. Optionally, the connections or links may be provided via wireless connectivity or links, such as via a wireless communication network or system, such as described in U.S. Pat. No. 7,004,593, which is hereby incorporated herein by reference in its entirety, without affecting the scope of the present invention. Data processing is flexible to be compatible with various real-time operating systems such as QNX or Linux or Microsoft CE or Microsoft Auto® or the like. Abstraction action of particular hardware and/or running of particular software is managed via a respective hardware abstraction layer and a software abstraction layer of the scalable integrated electronic control unit or module or system. The system manager scalable integrated electronic control unit or module or system (preferably comprising a TCET expander) functions as an overall system sentinel that manages the firewalls provided for data/processing and of I/O, that manages the flexibility and scalability of I/O, of multiple dataprocessors used, of memory and other data storage resources, of sub-system redundancy/fault recovery, of communications and of dynamic, and of situational awareness and/or the like.

Optionally, for example, if the vehicle is being driven in a forward direction, the forward facing camera may be operating to capture images for a lane departure warning system (LDW) or the like, with the captured image data being processed accordingly (such as by utilizing aspects of the systems described in U.S. Pat. Nos. 7,355,524; 7,205,904; 7,038,577; 5,929,786 and/or 5,786,772, and/or U.S. patent application Ser. No. 11/239,980, filed Sep. 30, 2005; and/or Ser. No. 11/315,675, filed Dec. 22, 2005, now U.S. Pat. No. 7,720,580, which are hereby incorporated herein by reference in their entireties). If the vehicle is then stopped, the system, responsive to the changed driving condition, may determine that the vehicle is stopped at a cross-traffic situation, such as via image processing to detect a stop sign or the like (such as by utilizing aspects of the systems described in U.S. Pat. Nos. 5,550,677; 5,670,935; 5,796,094; 5,877,897; 6,313,454; 6,353,392 6,396,397; 6,498,620; 7,004,606; 7,038,577; and/or 7,526,103, which are hereby incorporated herein by reference in their entireties) or by determining that the vehicle had been driving in a forward direction and then stopped moving. In response to such a determination that the vehicle is stopped at a cross-traffic situation, the video display, responsive to the image processor, may display the sideward directed views to assist the driver in driving forward into the intersection or out of a parking space in a parking lot or the like, such as described in PCT Application No. PCT/US2010/025545, filed Feb. 26, 2010; and/or U.S. provisional applications, Ser. No. 61/180,257, filed May 21, 2009; Ser. No. 61/156,184, filed Feb. 27, 2009; and Ser. No. 61/174,596, filed May 1, 2009, which are all hereby incorporated herein by reference in their entireties.

Optionally, the vision system may process the captured image data and/or may be associated with a navigation system to determine the location of the vehicle, such as to determine if the vehicle is in an urban environment or rural environment or the like. The navigation system may comprise any type of navigation system, and may utilize aspects of the systems described in U.S. Pat. Nos. 6,477,464; 5,924,212; 4,862,594; 4,937,945; 5,131,154; 5,255,442; 5,632,092; 7,004,593; 6,678,614; 7,167,796; and/or 6,946,978, which are all hereby incorporated herein by reference in their entireties. Optionally, the vehicle speed may be determined via processing of the images captured by the imaging sensors or cameras, such as by utilizing aspects of the systems described in U.S. Pat. No. 7,038,577, which is hereby incorporated herein by reference in its entirety. The system thus may take into account the driving conditions or geographic location of the vehicle in making the decision of whether or not to display the sideward views when it is determined that the vehicle has stopped at a potential cross-traffic driving situation.

Optionally, the system may determine that the vehicle is in or at another driving condition, such as, for example, a parallel parking situation. Such a condition may be determined by processing the captured image data and detecting the equipped vehicle being driven alongside a vacant parking space and being shifted into reverse to back into the vacant parking space. In such a situation, the video display may provide an overview of the vehicle (such as an iconistic representation of the vehicle showing the distances to vehicles or objects forward and rearward of the equipped vehicle, such as in a known manner).

The system of the present invention may be part of an overall active safety and sensing system, which may comprise the combination of machine vision activity or monitoring (such as for a lane departure warning system and/or the like) and vehicle control (such as via body/chassis sensors and sensing). The active safety and sensing system may include fusion/combination of outputs from various sensing devices to provide environmental awareness at and surrounding the vehicle and may provide partial or complete control of the vehicle as it is driven along a road and/or may provide alert warnings to the driver of the vehicle of what may be present environmentally exterior of the vehicle and/or what may be hazardous thereat. Machine vision forward facing cameras may be used to provide lane departure warning (LDW), traffic sign recognition (TSR), forward collision warning (FCW), pedestrian detection, vehicle detection, hazard detection and/or the like, and these systems may communicate with or cooperate with other systems, such as intelligent headlamp control or automatic headlamp control (AHC), intelligent light ranging (ILR) (a combination of AHC and ILR may be used for a glide path automatic headlamp control, for example, where the headlamps are actively or dynamically adjusted so that the beam pattern forward of the equipped vehicle can be configured to illuminate the road just ahead of an approaching vehicle), lane keep assist (LKA) (where the steering wheel may variably provide resistance to turning to further alert the driver of a detected potentially hazardous condition and/or may actively turn or control the steering system of the vehicle so as to mitigate or avoid an imminent potential collision) and/or the like.

Optionally, an LDW system or function may be extended to an LKA system or function by tracking the lane along which the vehicle is driven and controlling the steering torque to aid the driver in maintaining the vehicle in the lane. Optionally, the system may include a map input or geographical location input (such as from an onboard or an external GPS-based navigational system), whereby the vehicle safety system may be geographically/locally customized to operate differently or may process the image data differently or the like, in response to the map input or geographical location input indicative of the particular geographical location of the equipped vehicle at that moment in time. Optionally, and preferably, the map data/GPS derived information relating to, for example, the curvature and/or bank angle of a highway exit or entrance ramp may tie into the automatic headlamp control and/or the direction control of the headlamp beam. Optionally, for example, map data (such as longitude/latitude/altitude coordinates) may be provided in connection with or fused with a TSR system and/or an AHC/ILR system and/or an automatic cruise control (ACC) system to enhance performance of the TSR system and/or the AHC/ILR system and/or the ACC system. Optionally, the system may receive inputs from a Car2Car telematics communication system or a Car2X telematics communication system or the like.

Optionally, camera data or information may be fused with radar data or information (or with other non-vision based data, such as from ultrasonic sensors or infrared sensors or the like) to derive object information and emergency braking may be initiated in response to such object detection. Optionally, an LKA system and emergency braking system may cooperate to provide semi-autonomous driving. The system may utilize aspects of the systems described in U.S. Pat. No. 7,697,027, which is hereby incorporated herein by reference in its entirety.

Optionally, the image processor of the system may comprise an advanced image processing platform, such as, for example, an EyeQX image processing chip, such as an EyeQ2 or an EyeQ1 image processing chip available from Mobileye Vision Technologies Ltd. of Jerusalem, Israel, such as described in PCT Application No. PCT/US2010/025545, filed Feb. 26, 2010, which published on Sep. 2, 2010 as International Publication No. WO2010099416; and/or U.S. provisional applications, Ser. No. 61/180,257, filed May 21, 2009; Ser. No. 61/156,184, filed Feb. 27, 2009; and Ser. No. 61/174,596, filed May 1, 2009, which are all hereby incorporated herein by reference in their entireties.

The video display screen device or module may comprise any suitable type of video screen and is operable to display images in response to an input or signal from a control or imaging system. For example, the video display screen may comprise a multi-pixel liquid crystal module (LCM) or liquid crystal display (LCD), preferably a thin film transistor (TFT) multi-pixel liquid crystal display (such as discussed below), or the screen may comprise a multi-pixel organic electroluminescent display or a multi-pixel light emitting diode (LED), such as an organic light emitting diode (OLED) or inorganic light emitting diode display or the like, or a passive reflective and/or backlit pixelated display, or an electroluminescent (EL) display, or a vacuum fluorescent (VF) display or the like. For example, the video display screen may comprise a video screen of the types disclosed in U.S. Pat. Nos. 7,446,650; 7,370,983; 7,338,177; 7,274,501; 7,255,451; 7,195,381; 7,184,190; 6,902,284; 6,690,268; 6,428,172; 6,420,975; 5,668,663; 5,724,187, and/or U.S. patent application Ser. No. 12/414,190, filed Mar. 30, 2009, now U.S. Pat. No. 8,154,418; Ser. No. 10/538,724, filed Jun. 13, 2005, which published on Mar. 9, 2006 as U.S. Patent Publication No. 2006/0050018; Ser. No. 11/226,628, filed Sep. 14, 2005, which published on Mar. 23, 2006 as U.S. Patent Publication No. 2006/0061008; Ser. No. 12/091,525, filed Apr. 25, 2008, now U.S. Pat. No. 7,855,755; Ser. No. 09/585,379, filed Jun. 1, 2000, now abandoned; Ser. No. 10/207,291, filed Jul. 29, 2002, which published on Jan. 9, 2003 as U.S. Patent Publication No. US 2003/0007261; and/or Ser. No. 12/578,732, filed Oct. 14, 2009, which published on Apr. 22, 2010 as U.S. Patent Publication No. 2010/0097469, which are hereby incorporated herein by reference in their entireties. Optionally, video displays may be disposed at the rearview mirror assemblies and may be operable to display video images of the rearward scene, such as by utilizing aspects of the displays described in U.S. patent application Ser. No. 11/933,697, filed Nov. 1, 2007, now U.S. Pat. No. 7,777,611, which is hereby incorporated herein by reference in its entirety. Each mirror thus may provide a video display (such as including a video display screen disposed behind and viewable through a transflector or transflective mirror reflector of a reflective element) and the display may be larger if provided as a display-on-demand type of display behind a transflective mirror reflector of the reflective element and viewable through the transflective mirror reflector of the reflective element.

Optionally, the video display module may provide a graphic overlay to enhance the driver's cognitive awareness of the distances to objects to the rear of the vehicle (such as by utilizing aspects of the systems described in U.S. Pat. Nos. 5,670,935; 5,949,331; 6,222,447; and 6,611,202; and/or PCT Application No. PCT/US08/76022, filed Sep. 11, 2008, which published on Mar. 19, 2009 as International Publication No. WO 2009/036176, which are hereby incorporated herein by reference in their entireties. Such graphic overlays may be generated at or by the camera circuitry or the mirror or display circuitry. Optionally, the display module may comprise a high luminance 3.5 inch video display or a 4.3 inch video display, preferably having a display intensity of at least about 400 candelas per square meter ($cd/m^2$) as viewed through the reflective element (preferably as viewed through a transflective mirror reflector of the transflective reflective element) by a person viewing the mirror reflective element, more preferably at least about 1000 $cd/m^2$ as viewed through the reflective element (preferably as viewed through a transflective mirror reflector of the transflective reflective element) by a person viewing the mirror reflective element, and more preferably at least about 1500 $cd/m^2$ as viewed through the reflective element (preferably as viewed through a transflective mirror reflector of the transflective reflective element) by a person viewing the mirror reflective element.

The imaging device and control and image processor may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,123,168; 7,004,606; 6,946,978; 7,038,577; 6,353,392; 6,320,176; 6,313,454; and 6,824,281, which are all hereby incorporated herein by reference in their entireties. Optionally, the circuit board or chip may include circuitry for the imaging array sensor and or other electronic accessories or features, such as by utilizing compass-on-a-chip or EC driver-on-a-chip technology and aspects such as described in U.S. Pat. Nos. 7,255,451 and/or 7,480,149, and/or U.S. patent application Ser. No. 11/226,628, filed Sep. 14, 2005, which published on Mar. 23, 2006 as U.S. Patent Publication No. US 2006/0061008, which are hereby incorporated herein by reference in their entireties. The camera or camera module may comprise any suitable camera or imaging sensor, and may utilize aspects of the cameras or sensors described in U.S. Pat. No. 7,480,149 and/or U.S. patent application Ser. No. 12/091,359, filed Apr. 24, 2008, which published on Oct. 1, 2009 as U.S. Patent Publication No. US 2009/02443361; and/or Ser. No. 10/534,632, filed May 11, 2005, now U.S. Pat. No. 7,965,336; and/or U.S. provisional application Ser. No. 61/303,054, filed Feb. 10, 2010, which are all hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; and 7,004,606; and/or U.S. patent application Ser. No. 11/315,675, filed Dec. 22, 2005, now U.S. Pat. No. 7,720,580; and/or PCT Application No. PCT/US2003/036177 filed Nov. 14, 2003, and published Jun. 3, 2004 as PCT Publication No. WO 2004/047421, and/or PCT Application No. PCT/US2008/076022, filed Sep. 11, 2008, and/or PCT Application No. PCT/US2008/078700, filed Oct. 3, 2008, which are all hereby incorporated herein by reference in their entireties.

The control module of the present invention may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; and 7,339,149, and U.S. patent application Ser. No. 11/105,757, filed Apr. 14, 2005, now U.S. Pat. No. 7,526,103, which are all hereby incorporated herein by reference in their entireties, a rain sensor, such as the types disclosed in commonly assigned U.S. Pat. Nos. 6,353,392; 6,313,454; and/or 6,320,176, and/or U.S. patent application Ser. No. 11/201,661, filed Aug. 11, 2005, now U.S. Pat. No. 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,205,904; and 7,355,524; and/or in U.S. patent application Ser. No. 10/643,602, filed Aug. 19, 2003, now U.S. Pat. No. 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,355,524; 7,205,904; 7,038,577; 5,929,786 and/or 5,786,772, and/or U.S. pat. application Ser. No. 11/239,980, filed Sep. 30, 2005, now U.S. Pat. No. 7,881,496; and/or Ser. No. 11/315,675, filed Dec. 22, 2005, now U.S. Pat. No. 7,720,580, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268; and/or 7,370,983, and/or PCT Application No. PCT/US03/40611, filed Dec. 19, 2003 and published Jul. 15, 2004 as PCT Publication No. WO 2004/058540, and/or U.S. patent application Ser. No. 10/538,724, filed Jun. 13, 2005 and published Mar. 9, 2006 as U.S. Publication No. US-2006-0050018-A1, and/or U.S. provisional applications, Ser. No. 60/630,061, filed Nov. 22, 2004; and Ser. No. 60/667,048, filed Mar. 31, 2005, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the system may selectively control or operate alert devices or indicators, such as for the exterior rearview mirror assemblies, may utilize aspects of blind spot indicators or the like, such as indicators or light modules of the types described in U.S. Pat. Nos. 7,492,281; 6,227,689; 6,582,109; 5,371,659; 5,497,306; 5,669,699; 5,823,654; 6,176,602; 6,276,821; 6,198,409; 5,929,786; and 5,786,772, and/or U.S. patent application Ser. No. 11/226,628, filed Sep. 14, 2005, which published on Mar. 23, 2006 as U.S. Patent Publication No. US 2006/0061008; Ser. No. 11/520, 193, filed Sep. 13, 2006, now U.S. Pat. No. 7,581,859; and/or Ser. No. 11/912,576, filed Oct. 25, 2007, now U.S. Pat. No. 7,626,749, and/or PCT Application No. PCT/US2006/026148, filed Jul. 5, 2006, which published Jan. 11, 2007 as International Publication No. WO 2007/005942, and/or PCT Application No. PCT/US07/82099, filed Oct. 22, 2007, which published May 2, 2008 as International Publication No. WO 2008/051910, and/or PCT Application No. PCT/US2006/018567, filed May 16, 2006 and published Nov. 23, 2006 as International Publication No. WO 2006/124682, and/or U.S. provisional applications, Ser. No. 61/351,513, filed Jun. 4, 2010; and/or Ser. No. 61/238,862, filed Sep. 1, 2009, which are hereby incorporated herein by reference in their entireties.

Optionally, the interior and/or exterior mirror assemblies may comprise an electro-optic or electrochromic mirror assembly and may include an electro-optic or electrochromic reflective element. The electrochromic mirror element of the electrochromic mirror assembly may utilize the principles disclosed in commonly assigned U.S. Pat. Nos. 6,690, 268; 5,140,455; 5,151,816; 6,178,034; 6,154,306; 6,002, 544; 5,567,360; 5,525,264; 5,610,756; 5,406,414; 5,253, 109; 5,076,673; 5,073,012; 5,117,346; 5,724,187; 5,668, 663; 5,910,854; 5,142,407 and/or 4,712,879, which are hereby incorporated herein by reference in their entireties, and/or as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS., Optical Engineering Press, Wash. (1990), which are hereby incorporated by reference herein in their entireties; and/or as described in U.S. Pat. No. 7,195,381, which is hereby incorporated herein by reference in its entirety. Optionally, the electrochromic circuitry and/or a glare sensor (such as a rearward facing glare sensor that receives light from rearward of the mirror assembly and vehicle through a port or opening along the casing and/or bezel portion and/or reflective element of the mirror assembly) and circuitry and/or an ambient light sensor and circuitry may be provided on one or more circuit boards of the mirror assembly. The mirror assembly may include one or more other displays, such as the types disclosed in U.S. Pat. Nos. 5,530,240 and/or 6,329,925, which are hereby incorporated herein by reference in their entireties, and/or display-on-demand transflective type displays, such as the types disclosed in U.S. Pat. Nos. 7,274,501; 7,255,451; 7,195,381; 7,184,190; 5,668, 663; 5,724,187 and/or 6,690,268, and/or in U.S. patent application Ser. No. 11/226,628, which published on Mar. 23, 2006 as U.S. Patent Publication No. 2006/0061008, filed Sep. 14, 2005; Ser. No. 10/538,724, filed Jun. 13, 2005, which published on Mar. 9, 2006 as U.S. Patent Publication No. 2006/0050018; and/or Ser. No. 11/912,576, filed Oct. 25, 2007, now U.S. Pat. No. 7,626,749, and/or PCT Application No. PCT/US03/29776, filed Sep. 9, 2003 and published Apr. 1, 2004 as International Publication No. WO 2004/026633, and/or PCT Application No. PCT/US10/29173, filed Mar. 30, 2010, which published on Aug. 7, 2010 as International Publication No. WO 2010/114825, and/or PCT Application No. PCT/US10/32017, filed Apr. 22, 2010, which published on Oct. 28, 2010 as International Publication No. WO 2010/124064, which are all hereby incorporated herein by reference in their entireties. The thicknesses and materials of the coatings on the substrates, such as on the third surface of the reflective element assembly, may be selected to provide a desired color or tint to the mirror reflective element, such as a blue colored reflector, such as is known in the art and such as described in U.S. Pat. Nos. 5,910,854; 6,420,036; and/or 7,274,501, and in PCT Application No. PCT/US03/29776, filed Sep. 9, 2003 and published Apr. 1, 2004 as International Publication No. WO 2004/026633, which are all hereby incorporated herein by reference in their entireties.

Optionally, the interior rearview mirror assembly may comprise a prismatic mirror assembly or a non-electro-optic mirror assembly or an electro-optic or electrochromic mirror assembly. For example, the interior rearview mirror assembly may comprise a prismatic mirror assembly, such as the types described in U.S. Pat. Nos. 7,249,860; 6,318,870; 6,598,980; 5,327,288; 4,948,242; 4,826,289; 4,436,371; and 4,435,042; and PCT Application No. PCT/US2004/015424, filed May 18, 2004 and published on Dec. 2, 2004, as International Publication No. WO 2004/103772, which are hereby incorporated herein by reference in their entireties. Optionally, the prismatic reflective element may comprise a conventional prismatic reflective element or prism or may comprise a prismatic reflective element of the types described in U.S. Pat. Nos. 7,420,756; 7,274,501; 7,249, 860; 7,338,177; and/or 7,255,451, and/or U.S. patent application Ser. No. 12/558,892, filed Sep. 14, 2009, which published Apr. 8, 2010 as U.S. Patent Publication No. 2010/0085653, and/or PCT Application No. PCT/US03/29776, filed Sep. 19, 2003 and published Apr. 1, 2004 as International Publication No. WO 2004/026633; and/or PCT Application No. PCT/US2004/015424, filed May 18, 2004 and published on Dec. 2, 2004, as International Publication No. WO 2004/103772; and U.S. provisional application, Ser. No. 60/525,952, filed Nov. 26, 2003, which are all hereby incorporated herein by reference in their entireties, without affecting the scope of the present invention. Optionally, the mirror assembly and/or display may utilize aspects of the mirror assemblies described in U.S. provisional application Ser. No. 61/332,375, filed May 7, 2010, which is hereby incorporated herein by reference in its entirety. A variety of mirror accessories and constructions are known in the art, such as those disclosed in U.S. Pat. Nos. 5,555,136; 5,582,383; 5,680,263; 5,984,482; 6,227,675; 6,229,319; and 6,315,421 (the entire disclosures of which are hereby incorporated by reference herein), that can benefit from the present invention.

Optionally, the mirror assembly and/or reflective element may include one or more displays, such as for the accessories or circuitry described herein. The displays may be similar to those described above, or may be of types disclosed in U.S. Pat. Nos. 5,530,240 and/or 6,329,925, which are hereby incorporated herein by reference in their entireties, and/or may be display-on-demand or transflective type displays, such as the types disclosed in U.S. Pat. Nos. 7,195,381; 6,690,298; 5,668,663 and/or 5,724,187, and/or in U.S. patent application Ser. No. 11/226,628, filed Sep. 14, 2005, which published on Mar. 23, 2006 as U.S. Patent Publication No. US 2006/0061008; and/or Ser. No. 10/993, 302, filed Nov. 19, 2004, now U.S. Pat. No. 7,338,177; and/or in U.S. provisional applications, Ser. No. 60/525,952, filed Nov. 26, 2003; Ser. No. 60/717,093, filed Sep. 14, 2005; and/or Ser. No. 60/732,245, filed Nov. 1, 2005, and/or in PCT Application No. PCT/US03/29776, filed Sep. 19, 2003 and published Apr. 1, 2004 as International Publication No. WO 2004/026633, which are all hereby incorporated herein by reference in their entireties. Optionally, a prismatic reflective element may comprise a display on demand or transflective prismatic element (such as described in PCT Application No. PCT/US03/29776, filed Sep. 19, 2003 and published Apr. 1, 2004 as International Publication No. WO 2004/026633; and/or U.S. patent application Ser. No. 10/993,302, filed Nov. 19, 2004, now U.S. Pat. No. 7,338, 177; and/or U.S. provisional application, Ser. No. 60/525, 952, filed Nov. 26, 2003, which are all hereby incorporated herein by reference in their entireties) so that the displays are viewable through the reflective element, while the display area still functions to substantially reflect light, in order to provide a generally uniform prismatic reflective element even in the areas that have display elements positioned behind the reflective element.

Optionally, the display and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 6,877,888; 6,824,281; 6,690,268; 6,672,744; 6,386,742; and 6,124,886, and/or, and/or PCT Application No. PCT/US03/03012, filed Jan. 31, 2003 and published Aug. 7, 2003 as International Publication No. WO 03/065084, and/or PCT Application No. PCT/US03/40611, filed Dec. 19, 2003 and published Jul. 15, 2004 as International Publication No. WO 2004/058540, and/or PCT Application No. PCT/US04/15424, filed May 18, 2004 and published on Dec. 2, 2004, as International Publication No. WO 2004/103772, which are hereby incorporated herein by reference in their entireties. The user inputs may utilize aspects of the assemblies and systems described in U.S. Pat. Nos. 6,471,362; 7,360,932; 7,255,451; 7,249,860; 7,224,324; 6,001,486; 6,310,611; 6,320,282; 6,627,918; 7,446,924; 7,253,723; 6,504,531; 6,501,465; 6,492,980; 6,452,479; 6,437,258; and/or 6,369,804, and/or U.S. patent application Ser. No. 12/576,550, filed Oct. 9, 2009, which published on Apr. 15, 2010 as U.S. Patent Publication No. US 2010/0091394, and/or PCT Application No. PCT/US03/40611, filed Dec. 19, 2003 and published Jul. 15, 2004 as International Publication No. WO 2004/058540, which are all hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. A vehicular scalable integrated control system for a vehicle, said vehicular scalable integrated control system comprising:
   a plurality of cameras having respective fields of view exterior of the vehicle;
   said plurality of cameras comprising a front camera disposed at the front of the vehicle, a rear camera disposed at the rear of the vehicle, a first side view camera at the left side of the vehicle and a second side view camera at the right side of the vehicle;
   wherein said front camera, said rear camera, said first side view camera and said second side view camera are part of a surround vision system of the vehicle;
   a vehicular scalable integrated control unit, wherein said vehicular scalable integrated control unit comprises an image processor, and wherein image data captured by said plurality of cameras is processed by said image processor of said vehicular scalable integrated control unit;
   a display screen for displaying video information to a driver of the vehicle, and wherein said display screen displays video images derived, at least in part, from image data captured by at least one of said plurality of cameras;
   wherein said vehicular scalable integrated control system is operable to fuse image data captured by at least one camera of said plurality of cameras with data captured by at least one of (i) a radar device, (ii) an ultrasonic sensor and (iii) an infrared sensor;
   wherein said vehicular scalable integrated control system is part of an overall active safety sensing system of the vehicle;
   wherein said overall active safety sensing system includes fusion of outputs from a plurality of sensing devices to achieve environmental awareness at and surrounding the vehicle;
   wherein said overall active safety sensing system is operable to at least one of (i) at least partially control the vehicle as the vehicle is driven along a road and (ii) provide alert warnings to a driver of the vehicle;
   wherein said vehicular scalable integrated control system is operable to determine a current geographical location of the vehicle and is operable to download mapping data associated with the determined current geographical location of the vehicle;
   wherein said vehicular scalable integrated control unit includes a threat recognizer/evaluator and a risk assessor; and
   wherein threat recognition/evaluation by the threat recognizer/evaluator and risk assessment by the risk assessor of said vehicular scalable integrated control unit of said overall active safety sensing system is responsive, at least in part, to (i) processing by said image processor of image data captured by at least one camera of said plurality of cameras and (ii) said mapping data associated with the determined current geographical location of the vehicle.

2. The vehicular scalable integrated control system of claim 1, wherein said front camera, said rear camera, said first side view camera and said second side view camera connect to said vehicular scalable integrated control unit via Ethernet cabling.

3. The vehicular scalable integrated control system of claim 1, wherein said vehicular scalable integrated control system comprises a driver assistant system situation analysis vehicle control unit.

4. The vehicular scalable integrated control system of claim 1, wherein said image processor processes image data captured by said front camera for at least one of (i) a lane departure warning system of the vehicle and (ii) a lane keep assist system of the vehicle.

5. The vehicular scalable integrated control system of claim 4, wherein said vehicular scalable integrated control system is operable to determine that the vehicle is stopped at a cross traffic situation at least in part via said image processor processing image data captured by said front camera.

6. The vehicular scalable integrated control system of claim 4, wherein said vehicular scalable integrated control system is operable to determine a driving condition of the vehicle at least in part via said image processor processing image data captured by said front camera.

7. The vehicular scalable integrated control system of claim 4, wherein said image processor processes image data captured by said front camera for at least one of (i) a forward collision warning system of the vehicle, (ii) a pedestrian detection system of the vehicle, (iii) a vehicle detection system of the vehicle, (iv) a hazard detection system of the vehicle, (v) an automatic headlamp control of the vehicle, and (vi) an intelligent light ranging system of the vehicle.

8. The vehicular scalable integrated control system of claim 1, wherein said vehicular scalable integrated control system is operable to detect a stop sign at least in part via said image processor processing image data captured by said front camera.

9. The vehicular scalable integrated control system of claim 1, wherein said vehicular scalable integrated control system is operable to determine that the vehicle is stopped at a cross traffic situation at least in part at least in part via said image processor processing image data captured by said front camera.

10. The vehicular scalable integrated control system of claim 1, wherein, responsive at least in part to image processing by said image processor of image data captured by at least one camera of said plurality of cameras, said vehicular scalable integrated control system is operable to determine that the vehicle is at a situation.

11. The vehicular scalable integrated control system of claim 10, wherein, responsive at least in part to image processing by said image processor of image data captured by at least one camera of said plurality of cameras, said vehicular scalable integrated control system is operable to determine that the vehicle is at a parallel parking situation and wherein said vehicular scalable integrated control system is operable to determine that the vehicle is at a parallel parking situation by determining that the vehicle is driven alongside a vacant parking space and shifted into reverse to back into the vacant parking space.

12. The vehicular scalable integrated control system of claim 11, wherein, responsive to a determination that the vehicle is at a parallel parking situation, said vehicular scalable integrated control system is operable to display images at a display screen viewable by the driver of the vehicle to assist the driver in parking the vehicle in the vacant parking space.

13. The vehicular scalable integrated control system of claim 12, wherein said vehicular scalable integrated control system is operable to display an iconistic representation of the vehicle showing distances to vehicles or objects forward and rearward of the vehicle.

14. The vehicular scalable integrated control system of claim 1, wherein said vehicular scalable integrated control system is at least in part responsive to a communication from another vehicle via a car to car communication system.

15. The vehicular scalable integrated control system of claim 1, wherein, responsive to fusion of image data captured by at least one camera of said plurality of cameras with data captured by at least one of (i) a radar device, (ii) an ultrasonic sensor and (iii) an infrared sensor, said vehicular scalable integrated control system is operable to at least in part control braking of the vehicle.

16. The vehicular scalable integrated control system of claim 1, wherein said vehicular scalable integrated control unit determines the current geographical location of the vehicle responsive to a global positioning system of the vehicle.

17. A vehicular scalable integrated control system for a vehicle, said vehicular scalable integrated control system comprising:

a plurality of cameras having respective fields of view exterior of the vehicle;

said plurality of cameras comprising a front camera disposed at the front of the vehicle, a rear camera disposed at the rear of the vehicle, a first side view camera at the left side of the vehicle and a second side view camera at the right side of the vehicle;

wherein said front camera, said rear camera, said first side view camera and said second side view camera are part of a surround vision system of the vehicle;

a vehicular scalable integrated control unit, wherein said vehicular scalable integrated control unit comprises an image processor, and wherein image data captured by said plurality of cameras is processed by said image processor of said vehicular scalable integrated control unit;

a display screen for displaying video information to a driver of the vehicle, and wherein said display screen displays video images derived, at least in part, from image data captured by at least one of said plurality of cameras;

wherein said vehicular scalable integrated control system is operable to fuse image data captured by at least one camera of said plurality of cameras with data captured by at least one of (i) a radar device, (ii) an ultrasonic sensor and (iii) an infrared sensor;

wherein said vehicular scalable integrated control system is part of an overall active safety sensing system of the vehicle;

wherein said overall active safety sensing system includes fusion of outputs from a plurality of sensing devices to achieve environmental awareness at and surrounding the vehicle;

wherein said vehicular scalable integrated control system is operable to determine a current geographical location of the vehicle and is operable to download mapping data associated with the determined current geographical location of the vehicle;

wherein, responsive, at least in part, to (i) processing by said image processor of image data captured by at least one camera of said plurality of cameras and (ii) said mapping data associated with the determined current geographical location of the vehicle, said overall active safety sensing system is operable to at least one of (i) at least partially control the vehicle as the vehicle is driven along a road and (ii) provide alert warnings to a driver of the vehicle; and wherein said image processor processes image data captured by said front camera for at least one of (i) a lane departure warning system of the vehicle and (ii) a lane keep assist system of the vehicle.

18. The vehicular scalable integrated control system of claim 17, wherein said vehicular scalable integrated control system is at least in part responsive to a communication from another vehicle via a car to car communication system.

19. The vehicular scalable integrated control system of claim 17, wherein said image processor processes image data captured by said front camera for a pedestrian detection system of the vehicle.

20. A vehicular scalable integrated control system for a vehicle, said vehicular scalable integrated control system comprising:

a plurality of cameras having respective fields of view exterior of the vehicle;

said plurality of cameras comprising a front camera disposed at the front of the vehicle, a rear camera disposed at the rear of the vehicle, a first side view camera at the left side of the vehicle and a second side view camera at the right side of the vehicle;

wherein said front camera, said rear camera, said first side view camera and said second side view camera are part of a surround vision system of the vehicle;

a vehicular scalable integrated control unit, wherein said vehicular scalable integrated control unit comprises an image processor, and wherein image data captured by said plurality of cameras is processed by said image processor of said vehicular scalable integrated control unit;

a display screen for displaying video information to a driver of the vehicle, and wherein said display screen displays video images derived, at least in part, from image data captured by at least one of said plurality of cameras;

wherein said vehicular scalable integrated control system is operable to fuse image data captured by at least one camera of said plurality of cameras with data captured by at least one of (i) a radar device, (ii) an ultrasonic sensor and (iii) an infrared sensor;

wherein said vehicular scalable integrated control system is part of an overall active safety sensing system of the vehicle;

wherein said overall active safety sensing system includes fusion of outputs from a plurality of sensing devices to achieve environmental awareness at and surrounding the vehicle;

wherein said vehicular scalable integrated control system is operable to determine a current geographical location of the vehicle and is operable to download mapping data associated with the determined current geographical location of the vehicle;

wherein, responsive, at least in part, to (i) processing by said image processor of image data captured by at least one camera of said plurality of cameras and (ii) said mapping data associated with the determined current geographical location of the vehicle, said overall active safety sensing system is operable to at least one of (i) at least partially control the vehicle as the vehicle is driven along a road and (ii) provide alert warnings to a driver of the vehicle; and wherein, responsive to fusion of image data captured by at least one camera of said plurality of cameras with data captured by at least one of (i) a radar device, (ii) an ultrasonic sensor and (iii) an infrared sensor, said vehicular scalable integrated control system is operable to at least in part control braking of the vehicle.

* * * * *